(12) United States Patent
Ozaki et al.

(10) Patent No.: US 8,001,349 B2
(45) Date of Patent: Aug. 16, 2011

(54) ACCESS CONTROL METHOD FOR A STORAGE SYSTEM

(75) Inventors: Shinichi Ozaki, Yokohama (JP); Toshiyuki Haruma, Yokohama (JP); Manabu Obana, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 568 days.

(21) Appl. No.: 11/624,770

(22) Filed: Jan. 19, 2007

(65) Prior Publication Data

US 2008/0148051 A1  Jun. 19, 2008

(30) Foreign Application Priority Data

Oct. 31, 2006  (JP) .................................. 2006-295496

(51) Int. Cl.
*G06F 12/00* (2006.01)
*G06F 12/14* (2006.01)

(52) U.S. Cl. ........ 711/163; 711/170; 711/154; 711/164; 711/E12.091; 711/E12.093; 711/E12.098; 711/E12.103; 709/203

(58) Field of Classification Search .............. 711/163, 711/170, 154, 164, E12.091, E12.093, E12.098, 711/E12.103; 709/203, 219, 105
See application file for complete search history.

(56) References Cited

U.S. PATENT DOCUMENTS

| | | | |
|---|---|---|---|
| 2004/0199743 A1* | 10/2004 | Loaiza et al. | 711/202 |
| 2006/0126906 A1* | 6/2006 | Sato et al. | 382/118 |
| 2007/0001805 A1* | 1/2007 | Utter et al. | 340/5.72 |

FOREIGN PATENT DOCUMENTS

JP  2000-276406  10/2000

* cited by examiner

*Primary Examiner* — Midys Rojas
(74) *Attorney, Agent, or Firm* — Brundidge & Stanger, P.C.

(57) ABSTRACT

In the computer system including at least one host computer, and at least one storage system, the storage system includes a physical disk and a disk controller, and provides the host computer with a storage area of the physical disk as at least one logical unit, and the host computer includes at least one application program accessing the logical unit, and a storage area access control unit for, before the application program makes access to the logical unit, transmitting authentication information guaranteeing the application program as a source of the access to the storage system.

14 Claims, 17 Drawing Sheets

| | 1221 | 1222 | 1223 | 1224 | 1225 |
|---|---|---|---|---|---|
| | AP NAME | STORAGE SYSTEM NAME | LUN | CERTIFICATE | ACCESS COUNT |
| | AP1 | SUBSYSTEM1 | LU1 | CERT1B | 138 |
| | AP1 | SUBSYSTEM1 | LU2 | CERT2B | 510 |
| | AP1 | SUBSYSTEM2 | LU1 | CERT3B | 769 |
| | AP2 | SUBSYSTEM1 | LU1 | CERT4B | 425 |

122
CERTIFICATE MANAGEMENT TABLE

FIG. 2

| 1231 | 1232 | 1233 | 1234 |
|---|---|---|---|
| HBA NUMBER | STORAGE SYSTEM NAME | PORT NUMBER | LUN |
| HBA1 | SUBSYSTEM1 | PORT1 | LU1 |
| HBA2 | SUBSYSTEM1 | PORT2 | LU2 |
| HBA1 | SUBSYSTEM2 | PORT1 | LU1 |
| HBA1 | SUBSYSTEM1 | PORT1 | LU1 |

123
HOST PATH MANAGEMENT TABLE

FIG. 3

| 3231 | 3232 | 3233 | 3234 | 3235 | 3236 | 3237 | 3238 | 3239 |
|---|---|---|---|---|---|---|---|---|
| HOST NAME | AP NAME | STORAGE SYSTEM NAME | LUN | PUBLIC KEY | SECRET KEY | HOST CERTIFICATE | EXPIRATION DATE | ACCESS COUNT |
| HOST1 | AP1 | SUBSYSTEM1 | LU1 | KEY1 | PKEY1 | CERT1B | 2007/03/31 | 138 |
| HOST1 | AP1 | SUBSYSTEM1 | LU2 | KEY2 | PKEY2 | CERT2B | 2007/07/04 | 510 |
| HOST1 | AP1 | SUBSYSTEM2 | LU1 | KEY3 | PKEY3 | CERT3B | 2006/12/01 | 769 |
| HOST1 | AP2 | SUBSYSTEM1 | LU1 | KEY4 | PKEY4 | CERT4B | 2007/02/28 | 425 |
| HOST2 | AP1 | SUBSYSTEM1 | LU1 | KEY5 | PKEY5 | CERT5B | 2007/01/31 | 387 |

323
HOST CERTIFICATE MANAGEMENT TABLE

FIG. 4

| 3241 | 3242 | 3243 | 3244 | 3245 |
|---|---|---|---|---|
| STORAGE SYSTEM NAME | PUBLIC KEY | SECRET KEY | STORAGE CERTIFICATE | EXPIRATION DATE |
| SUBSYSTEM1 | KEY6 | PKEY6 | CERT1A | 2007/04/01 |
| SUBSYSTEM2 | KEY7 | PKEY7 | CERT2A | 2006/12/31 |

324
STORAGE CERTIFICATE MANAGEMENT TABLE

FIG. 5

| 3251 | 3252 |
| --- | --- |
| HOST NAME | AP NAME |
| HOST1 | AP1 |
| HOST1 | AP2 |
| HOST2 | AP1 |
| HOST2 | AP2 |

325
HOST MANAGEMENT TABLE

FIG. 6

| 3261 | 3262 | 3263 | 3264 | 3265 |
| --- | --- | --- | --- | --- |
| HOST NAME | HBA NUMBER | STORAGE SYSTEM NAME | PORT NUMBER | LUN |
| HOST1 | HBA1 | SUBSYSTEM1 | PORT1 | LU1 |
| HOST1 | HBA2 | SUBSYSTEM1 | PORT2 | LU2 |
| HOST1 | HBA1 | SUBSYSTEM2 | PORT1 | LU1 |
| HOST1 | HBA1 | SUBSYSTEM1 | PORT1 | LU1 |
| HOST2 | HBA1 | SUBSYSTEM1 | PORT1 | LU1 |

326
MANAGEMENT SERVER PATH MANAGEMENT TABLE

FIG. 7

ACCESS CONTROL METHOD FOR A STORAGE SYSTEM

CLAIM OF PRIORITY

The present application claims priority from Japanese patent application P2006-295496 filed on Oct. 31, 2006, the content of which is hereby incorporated by reference into this application.

BACKGROUND

This invention relates to a computer system including a host computer and a storage system, and more particularly to a technology for preventing an illegal access to a storage area in the storage system.

Under a storage area network (SAN) environment, multiple host computers can access a single storage system. Thus, it is necessary to prevent an illegal access to the storage system, and an illegal access to a storage area in the storage system.

A technology for preventing an illegal access to a storage system is disclosed in JP 2000-276406 A. According to this technology, a storage system detects an illegal access by checking an ID of an I/O port included in a host computer.

According to this technology, the storage system maps I/O port ID's which belong to systems different from each other for respective protocols to ID's which the storage system can identify. With this configuration, the storage system can prevent an illegal access for respective ports independently of the protocol.

SUMMARY

According to the technology disclosed in JP 2000-276406 A, the storage system detects an illegal access by checking an ID of an I/O port included in a host computer. In other words, if an ID of an I/O port is legal, the storage system permits an access. Therefore, if an illegal application program running on a host computer makes an illegal access to the storage system, this illegal access cannot be prevented. As a result, information leak and data destruction by the illegal application program can occur. It should be noted that the illegal application programs include spyware and the like, which is flourishing these days.

This invention has been made in view of the above-mentioned problem, and it is therefore an object of this invention to provide a computer system which prevents illegal accesses for respective application programs provided to host computers.

A computer system according to a representative embodiment of this invention includes: at least one host computer including a processor, a memory, and an interface; and at least one storage system connected to the host computer, and in the computer system, the storage system includes a physical disk for storing data requested to be written by the host computer, and a disk controller for controlling input and output of data to and from the physical disk, and provides the host computer with a storage area of the physical disk as at least one logical unit; and the host computer includes at least one application program accessing the logical unit, and a storage area access control unit for, before the application program makes access to the logical unit, transmitting authentication information guaranteeing the application program as a source of the access to the storage system.

According to the representative embodiment of this invention, it is possible to prevent illegal accesses for respective application programs provided to host computers.

BRIEF DESCRIPTION OF THE DRAWINGS

The present invention can be appreciated by the description which follows in conjunction with the following figures, wherein:

FIG. 2 is a configuration diagram of a certificate management table stored in a host computer according to the embodiment of this invention;

FIG. 3 is a configuration diagram of a host path management table stored in the host computer according to the embodiment of this invention;

FIG. 4 is a configuration diagram of a host certificate management table stored in a storage management server according to the embodiment of this invention;

FIG. 5 is a configuration diagram of a storage certificate management table stored in the storage management server according to the embodiment of this invention;

FIG. 6 is a configuration diagram of a host management table stored in the storage management server according to the embodiment of this invention;

FIG. 7 is a configuration diagram of a management server path management table stored in the storage management server according to the embodiment of this invention;

DETAILED DESCRIPTION OF THE PREFERRED EMBODIMENTS

A description will now be given of an embodiment of this invention with reference to drawings.

Figure 1:
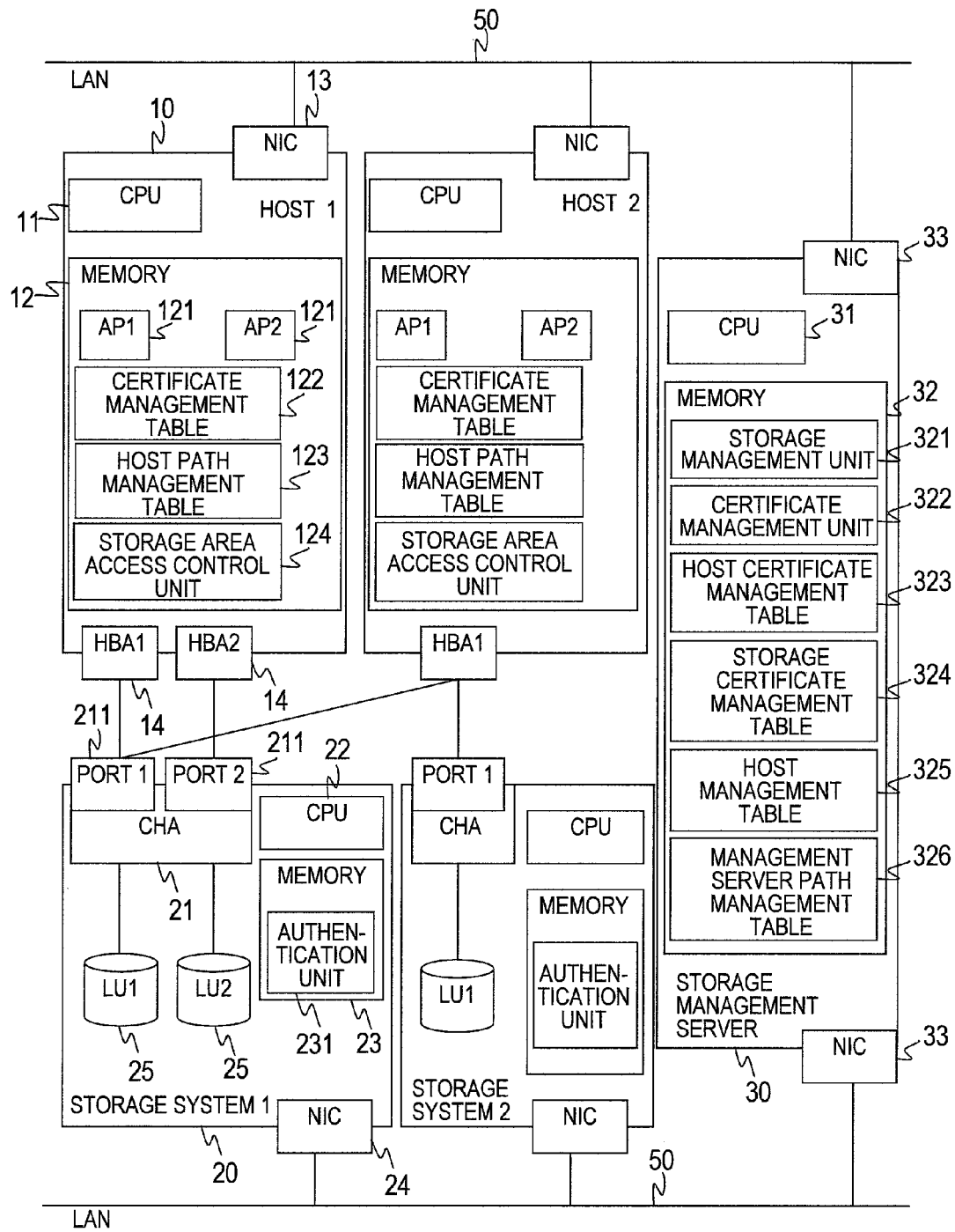
FIG. 1 is a block diagram of a configuration of a computer system according to an embodiment of this invention.

FIG. 1 is a block diagram of a configuration of a computer system according to the embodiment of this invention.

The computer system includes host computers 10, storage systems 20, and a storage management server 30.

The host computers 10 and the storage systems 20 are connected with each other via a SAN. The SAN includes at least one Fibre Channel switches. The Fibre Channel switches control communication between the host computers 10 and the storage systems 20.

It should be noted that, according to the embodiment, logical units (LU's) 25 provided by the storage systems 20 and the host computers 10 are connected via multiple paths. The paths are access paths from the host computers 10 to the LU's 25. Specifically, the paths are logical paths multiplexed according to combinations of physical paths serving in communication lines between the host computers 10 and the storage systems 20.

Moreover, the host computers 10 and the storage management server 30 are connected with each other via a local area network (LAN) 50. Similarly, the storage systems 20 and the storage management server are connected with each other via the LAN 50.

Though two host computers 10 are illustrated, the computer system may include an arbitrary number of host computers 10. Similarly, though two storage systems 20 are illustrated, the computer system may include an arbitrary number of storage systems 20.

The host computer 10 reads/writes data from/to LU 25's provided by the storage systems 20. The host computer 10 includes a CPU 11, a memory 12, a network interface card (NIC) 13, and a host bus adaptor (HBA) 14. Though one host computer 10 includes two HBA's 14 in FIG. 1, the one host computer 10 may include an arbitrary number of HBA's 14.

The NIC 13 is an interface connected to the LAN 50. The HBA 14 is an interface connected to the SAN. The CPU 11 executes programs stored in the memory 12 to carry out various types of process.

The memory 12 stores programs executed by the CPU 11, information required by the CPU 11, and the like. Specifically, the memory 12 stores application programs 121, a certificate management table 122, a host path management table 123, and a storage area access control unit 124.

The application program 121 is a program which executes a specific process. For example, the application program 121 issues a SCSI command to a storage system 20. The SCSI command is a write command or a read command, for example. Though the memory 12 stores two application programs 121 in FIG. 1, the memory 12 may store an arbitrary number of application programs 121.

The certificate management table 122 manages certificates to be transmitted when an application program 121 issues a SCSI command. It should be noted that a detailed description will be given of the certificate management table 122 with reference to FIG. 2.

The host path management table 123 indicates components through which a path connected to the host computer 10 routes. The components include at least one of the HBA 14 included in the host computer 10, a CHA port 211 included in the storage system 20, and a LU 25 provided by a storage system 20. It should be noted that a detailed description will be given of the host path management table 123 with reference to FIG. 3.

The storage area access control unit 124 controls an access from an application program 121 to an LU 25 provided by the storage system 20. For example, if an application program 121 issues a SCSI command which requests for an access to an LU 25 of a storage system 20, the storage area access control unit 124 transmits a certificate to the storage system 20.

The certificate to be transmitted corresponds to a combination of the application program 121, which is to be a source of the access, and the LU 25, which is to be a destination of the access. Therefore, the certificate to be transmitted guarantees the application program 121 included in the host computer 10 as the access source. Moreover, the certificate to be transmitted guarantees the LU 25 of the storage system 20 as the access destination.

The storage area access control unit 124 may transmit other information which guarantees an application program 121 included in the host computer 10 as the access source in place of the certificate to a storage system 20. In this case, if the storage system 20 determines that the access source is a legal application program 121, the storage area access control unit 124 permits the legal application program 121 to access an LU 25.

Moreover, the storage area access control unit 124 refers to the host path management table 123 to manage paths. For example, the storage area access control unit 124 provides paths by multiplexing the physical paths which connect the host computer 10 and a storage system 20 with each other.

Moreover, the storage area access control unit 124 may include a load balancing function. In this case, the storage area access control unit 124 distributes a load on a path by allocating I/O's to different paths.

For example, the storage area access control unit 124, after having transmitted a predetermined number of I/O's via one path, selects a next path. Then, the storage area access control unit 124 uses the selected next path to transmit I/O's. Moreover, the storage area access control unit 124 may transmit an I/O for successive blocks via the same path. It should be noted that the storage area access control unit 124 refers to the host path management table 123 to select a path to be used to transmit an I/O.

Moreover, the storage area access control unit 124 may provide a path change function. Specifically, the storage area access control unit 124, upon detecting a failure generated on a path, closes the path in which the failure is detected (puts the path into offline). As a result, the storage area access control unit 124 does not use the path in which the failure is detected to transmit I/O's. Then, the storage area access control unit 124 uses a path, which is not closed, to transmit I/O's. It should be noted that a state of a path not being closed is referred to as online.

It should be noted that the storage area access control unit 124 can detect a failure of a path by executing a path failure detection process (path health check).

Specifically, the storage area access control unit 124 transmits a SCSI command: INQUIRY as a failure detection signal (conduction check signal) to the storage system 20 via a path whose state is to be checked. Then, the storage area access control unit 124, based on whether the failure detection signal is normally transmitted or not, determines the state of the path. Specifically, the storage area access control unit 124 determines, upon having normally transmitted the failure detection signal, that the path is normal. On the other hand, the storage area access control unit 124 determines, upon having not normally transmitted the failure detection signal, that the path is being failed.

The storage system 20 includes a disk controller (DKC) and physical disks. It should be noted that the storage system 20 may include a flash memory in place of the physical disk.

The disk controller reads/writes data from/to the physical disks. Moreover, the disk controller provides the host computer 10 with storage areas of the physical disk as the logical units (LU) 25.

Moreover, the disk controller includes a channel adaptor (CHA) 21, a CPU 22, a memory 23, and an NIC 24. The CHA 21 controls the data transfer to/from the host computers 10. Moreover, the CHA 21 includes at least one CHA port 211. The CHA port 211 is an interface connected to the SAN.

The NIC 24 is an interface connected to the LAN 50.

The CPU 22 executes a program stored in the memory 23 to execute various types of process. The memory 23 stores programs executed by the CPU 22, information required by the CPU 22, and the like. Specifically, the memory 23 stores an authentication unit 231.

The authentication unit 231 receives a certificate from the storage area access control unit 124 included in the host computer 10. Then, the authentication unit 231 verifies the received certificate. Then, the authentication unit 231 transmits a result of the verification of the received certificate to the storage area access control unit 124 included in the host computer 10. Then, the storage area access control unit 124 included in the host computer 10, based on the received result of the verification, controls the access of an application program 121 to an LU 25 of the storage system 20.

The storage management server 30 manages the host computers 10 and the storage systems 20. Moreover, the storage management server 30 includes a CPU 31, a memory 32, and an NIC 33.

The NIC 33 is an interface connected to the LAN 50.

The CPU 31 executes a program stored in the memory 32 to execute various types of process. The memory 32 stores programs executed by the CPU 31, information required by the CPU 31, and the like. Specifically, the memory 32 stores a storage management unit 321, a certificate management unit 322, a host certificate management table 323, a storage certificate management table 324, a host management table 325, and a management server path management table 326.

The storage management unit 321 manages the configuration of the storage systems 20. The certificate management unit 322 creates, distributes, and manages certificates.

The host certificate management table 323 manages certificates distributed to the host computers 10 managed by the storage management server 30. It should be noted that a detailed description will be given of the host certificate management table 323 with reference to FIG. 4.

The storage certificate management table 324 manages certificates distributed to the storage systems 20 managed by the storage management server 30. It should be noted that a detailed description will be given of the storage certificate management table 324 with reference to FIG. 5.

The host management table 325 manages the application programs 121 executed by the host computers 10 managed by the storage management server 30. It should be noted that a detailed description will be given of the host management table 325 with reference to FIG. 6.

The management server path management table 326 indicates components through which paths connected to the host computers 10 managed by the storage management server 30 route. It should be noted that a detailed description will be given of the management server path management table 326 with reference to FIG. 7.

FIG. 2 is a configuration diagram of the certificate management table 122 stored in the host computer 10 according to the embodiment of this invention.

The certificate management table 122 includes application program names 1221, storage system names 1222, LUN's 1223, certificates 1224, and access counts 1225.

An application program name 1221 is a unique identifier for an application program 121 included in the host computer 10. A storage system name 1222 is a unique identifier of a storage system 20 accessed by the application program 121 identified by the application program name 1221 of the record.

An LUN 1223 is a unique identifier of an LU 25 which is one of LU's 25 of the storage system 20 identified by the storage system name 1222 of the record, and is accessed by the application program 121 identified by the application program name 1221 of the record.

The certificate 1224 is a digital certificate corresponding to an access from the application program 121 identified by the application program name 1221 of the record to the LU 25 identified by the LUN 1223 of the record. In other words, the certificate 1224 guarantees that this access is an access from the application program 121 identified by the application program name 1221 of the record to the LU 25 identified by the LUN 1223 of the record. Thus, if a SCSI command which requests for the access from the application program 121 identified by the application program name 1221 of the record to the LU 25 identified by the LUN 1223 of the record is issued, the storage area access control unit 124 transmits the certificate 1224 of the record to the storage system 20.

The access count 1225 is the number of accesses (I/O's) from the application program 121 identified by the application program name 1221 of the record to the LU 25 identified by the LUN 1223 of the record. It should be noted that the access count 1225 is the number of accesses made after the certificate 1224 of the record is issued.

FIG. 3 is a configuration diagram of the host path management table 123 stored in the host computer 10 according to the embodiment of this invention.

The host path management table 123 includes HBA numbers 1231, storage system names 1232, port numbers 1233, and LUN's 1234.

One record of the host path management table 123 corresponds to one path to be connected to the host computer 10 which stores the host path management table 123.

An HBA number 1231 is a unique identifier of an HBA 14 through which a path corresponding to the record routes. A storage system name 1232 is a unique identifier of a storage system 20 through which the path corresponding to the record routes.

A port number 1233 is a unique identifier of a CHA port 211 which is one of CHA ports 211 included in the storage system 20 identified by the storage system name 1232 of the record, and through which the path corresponding to the record routes. An LUN 1234 is a unique identifier of an LU 25 which is one of LU's 25 provided by the storage system 20 identified by the storage system name 1232 of the record, and through which the path corresponding to the record routes.

FIG. 4 is a configuration diagram of the host certificate management table 323 stored in the storage management server 30 according to the embodiment of this invention.

The host certificate management table 323 includes host names 3231, application program names 3232, storage system names 3233, LUN's 3234, public keys 3235, secret keys 3236, host certificates 3237, expiration dates 3238, and access counts 3239.

A host name 3231 is a unique identifier of a host computer 10 managed by the storage management server 30. An application program name 3232 is a unique identifier for an application program 121 included in the host computer 10 identified by the host name 3231 of the record. A storage system name 3233 is a unique identifier of a storage system 20 accessed by the application program 121 identified by the application program name 3232 of the record.

An LUN 3234 is a unique identifier of an LU 25 which is one of LU's 25 of the storage system 20 identified by the storage system name 3233 of the record, and is accessed by the application program 121 identified by the application program name 3232 of the record.

A public key 3235 and a secret key 3236 are keys corresponding to an access from the application program 121 identified by the application program name 3232 of the record to the LU 25 identified by the LUN 3234 of the record.

A host certificate 3237 is a digital certificate corresponding to the access from the application program 121 identified by the application program name 3232 of the record to the LU 25 identified by the LUN 3234 of the record. In other words, the host certificate 3237 guarantees that this access is an access from the application program 121 identified by the application program name 3232 of the record to the LU 25 identified by the LUN 3234 of the record. An expiration date 3238 is a date until which the host certificate 3237 of the record is valid.

The access count 3239 is the number of accesses from the application program 121 identified by the application program name 3232 of the record to the LU 25 identified by the LUN 3234 of the record. It should be noted that the access count 3239 is the number of accesses after the host certificate 3237 of the record is issued.

FIG. 5 is a configuration diagram of the storage certificate management table 324 stored in the storage management server 30 according to the embodiment of this invention.

The storage certificate management table 324 includes storage system names 3241, public keys 3242, secret keys 3243, storage certificates 3244, and expiration dates 3245.

A storage system name 3241 is a unique identifier of a storage system 20 managed by the storage management server 30. A public key 3242 and a secret key 3243 are keys corresponding to the storage system 20 identified by the storage system name 3241 of the record.

The storage certificate 3244 is a digital certificate corresponding to the storage system 20 identified by the storage system name 3241 of the record. An expiration date 3245 is a date until which the storage certificate 3244 of the record is valid.

FIG. 6 is a configuration diagram of the host management table 325 stored in the storage management server 30 according to the embodiment of this invention.

The host management table 325 includes host names 3251 and application program names 3252.

A host name 3251 is a unique identifier of a host computer 10 managed by the storage management server 30. An application program name 3252 is a unique identifier for an application program 121 included in the host computer 10 identified by the host name 3251 of the record.

FIG. 7 is a configuration diagram of the management server path management table 326 stored in the storage management server 30 according to the embodiment of this invention.

The management server path management table 326 includes host names 3261, HBA numbers 3262, storage system names 3263, port numbers 3264, and LUN's 3265.

One record of the management server path management table 326 corresponds to one path connected to a host computer 10 managed by the storage management server 30.

A host name 3261 is a unique identifier of a host computer 10 managed by the storage management server 30. An HBA number 3262 is a unique identifier of an HBA 14 through which a path corresponding to the record routes. A storage system number 3263 is a unique identifier of a storage system 20 through which the path corresponding to the record routes.

A port number 3264 is a unique identifier of a CHA port 211 which is one of CHA ports 211 included in the storage system 20 identified by the storage system name 3263 of the record, and through which the path corresponding to the record routes. An LUN 3265 is a unique identifier of an LU 25 which is one of LU's 25 provided by the storage system 20 identified by the storage system name 3263 of the record, and through which the path corresponding to the record routes.

A description will now be given of processes executed by the computer system according to the embodiment of this invention.

Figure 8:
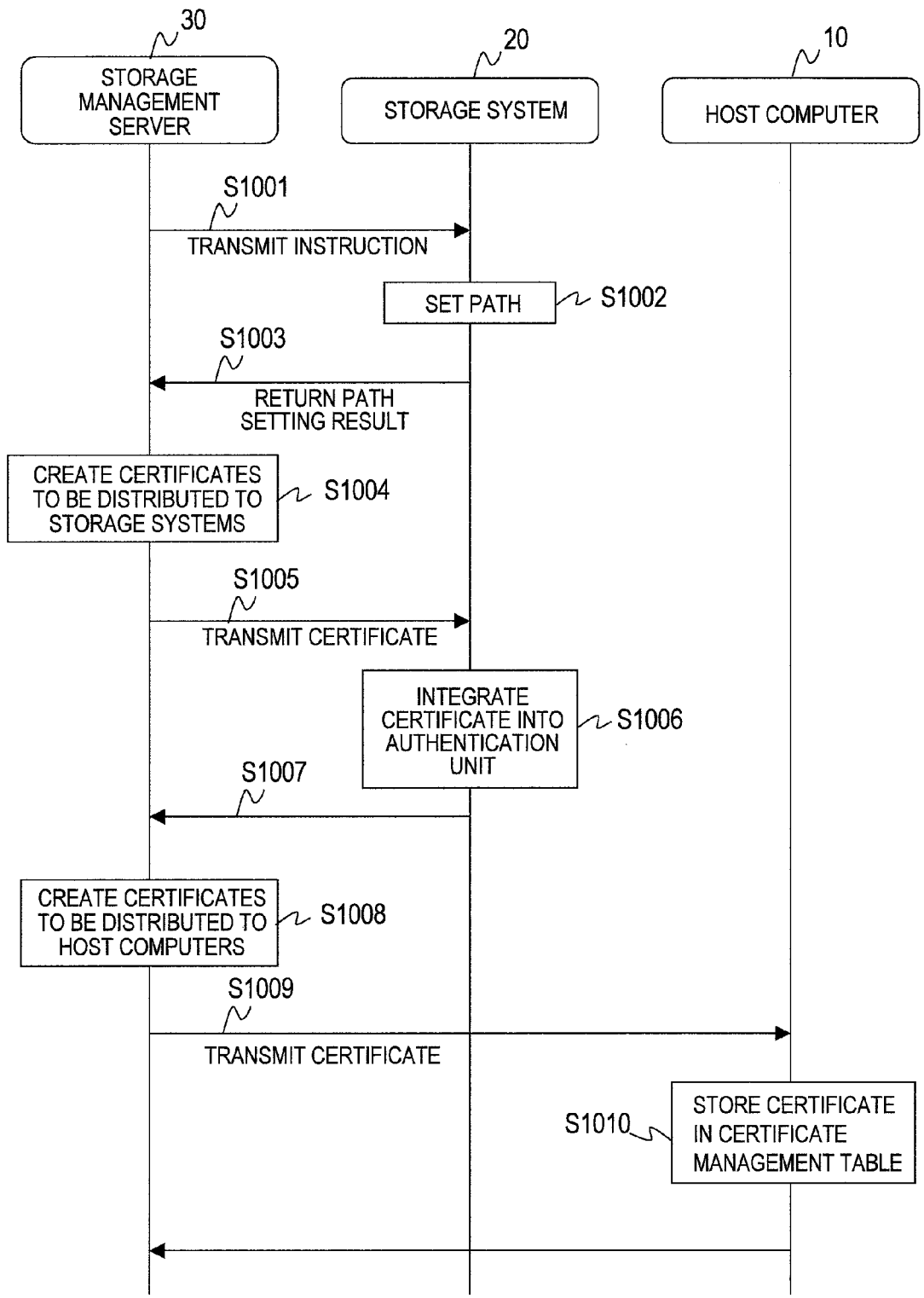
FIG. 8 is a sequence diagram of a path setting process of the computer system according to the embodiment of this invention.

FIG. 8 is a sequence diagram of a path setting process of the computer system according to the embodiment of this invention.

First, the storage management server 30 receives a path setting request from an administrator or the like. For example, the storage management server 30 receives an input of a path setting request from the administrator or the like. The storage management server 30 may receive a path setting request from a host computer 10.

The storage management server 30, upon receiving the path setting request, instructs storage systems 20 to set paths (S1001).

The storage system 20, upon receiving the path setting request, sets a path (S1002). It should be noted that a path is an access path from the host computer 10 to an LU 25 of the storage system 20.

Then, the storage system 20 transmits a path setting result including information on a configuration of the set path to the storage management server 30 (S1003). It should be noted that the information on the configuration of a set path includes identifies of components through which the path routes and the like.

The storage management server 30 receives the path setting results from the storage systems 20. Then, the storage management server 30, based on the received path setting results, updates the management server path management table 326. Specifically, the storage management server 30 adds new records to the management server path management table 326. Then, the storage management server 30 stores the information on the path configuration included in the received path setting results in the created new records.

Then, the storage management server 30 creates certificates (storage certificates) for respective storage systems 20 to be distributed to the storage systems 20 (S1004). In other words, one created certificate corresponds to one storage system 20.

Then, the storage management server 30 stores the created certificates in the storage certificate management table 324. As a result, the storage management server 30 updates the storage certificate management table 324.

Then, the storage management server 30 transmits the respective created certificates to the corresponding storage systems 20 (S1005).

The storage system 20 receives the certificate from the storage management server 30. Then, the storage system 20 integrates the received certificate into the authentication unit 231 included in the storage system 20 (S1006). As a result, the authentication unit 231 included in the storage system 20 uses the integrated certificate to verify a certificate transmitted from the host computer 10.

Then, the storage system 20, upon having received the certificate, notifies the storage management server 30 of the completion of the reception of the certificate (S1007).

The storage management server 30 receives the notices of the completion of the reception of the certificate from the storage systems 20. Then, the storage management server 30 creates certificates (host certificates) to be distributed to the host computers 10 (S1008). On this occasion, the storage management server 30 creates certificates for respective combinations of an application program 121 included in the host computer 10 and an LU 25 accessed by the application program 121. In other words, one created certificate corresponds to one combination of an application program 121, which is to be an access source, and an LU 25, which is to be an access destination.

Then, the storage management server 30 stores the created certificates in the host certificate management table 323. As a result, the storage management server 30 updates the host certificate management table 323.

Then, the storage management server 30 transmits the respective created certificates to the host computers 10 including the corresponding application programs 121 (S1009). Moreover, the storage management server 30 transmits the information on the path configuration included in the path setting result received in the step S1003 to the host computers 10.

The host computer 10 receives the certificates and the information on the path configuration from the storage management server 30. Then, the host computer 10 stores the received certificates in the certificate management table 122 (S1010). As a result, when an application program 121 issues a SCSI command requesting for an access to an LU 25, the storage area access control unit 124 included in a host computer 10 transmits a certificate stored in the storage management table 122 to a storage system 20.

Moreover, the host computer 10 updates the host path management table 123 based on the received information on the path configuration. Specifically, the host computer 10 adds new records to the host path management table 123. Then, the host computer 10 stores the received information on the path configuration in the created new records.

Then, the host computer 10 notifies the storage management server 30 of the completion of the reception of the certificates.

Then, the path setting process ends in the computer system.

Figure 9:
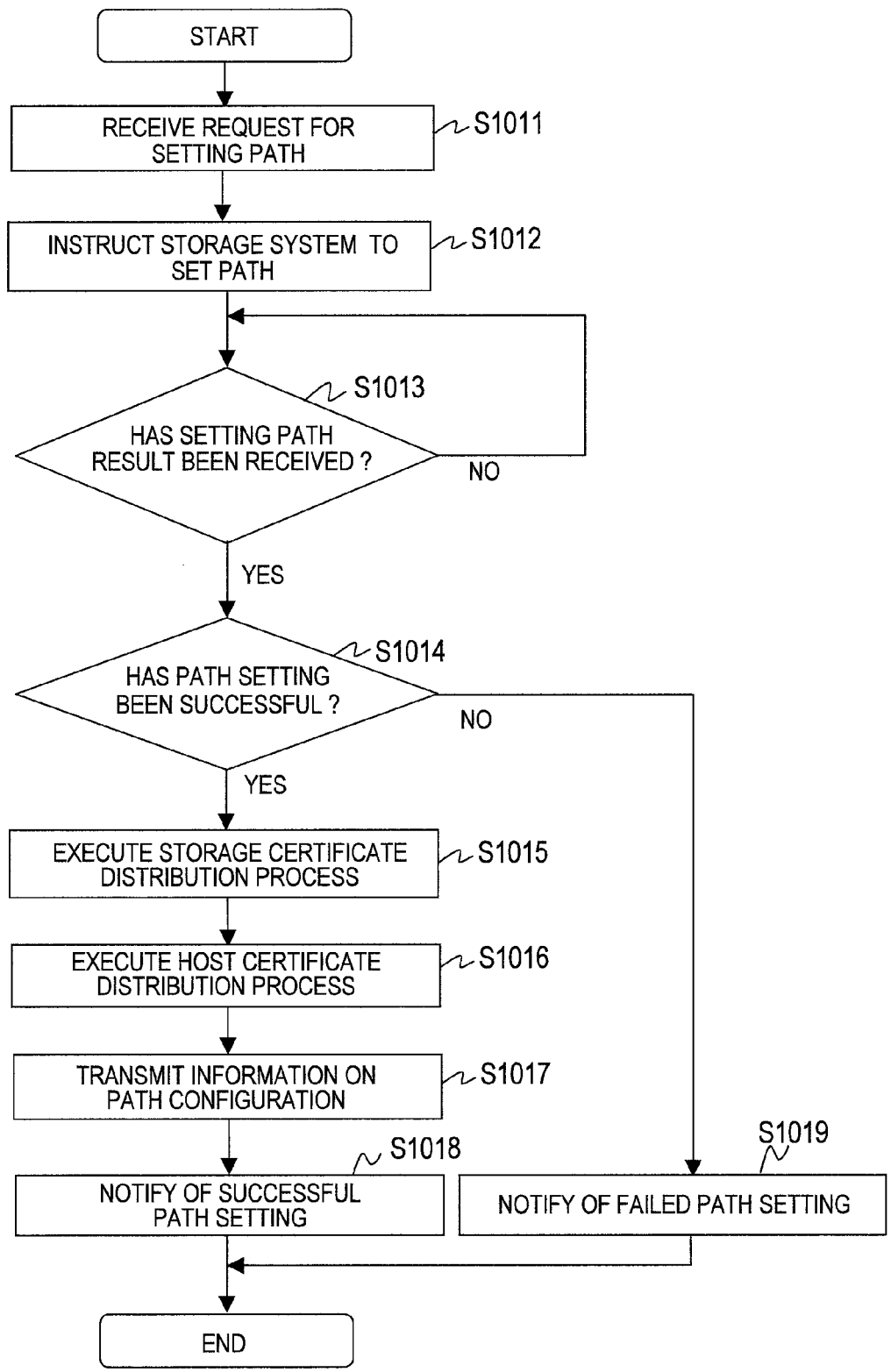
FIG. 9 is a flowchart of the path setting process by the storage management server according to the embodiment of this invention.

FIG. 9 is a flowchart of the path setting process by the storage management server 30 according to the embodiment of this invention.

The storage management server 30, upon receiving a path setting request from the administrator or the like, starts the path setting process (S1011). First, the storage management server 30 instructs the storage systems 20 to set paths (S1012).

Then, the storage management server 30 determines whether all path setting results have been received from the storage systems 20 (S1013). If all the path setting results have not been received, the storage management server 30 waits until reception of all the path setting results.

On the other hand, if the storage management server 30 has received all the path setting results, the storage management server 30 refers to the path setting results to determine whether the path setting has been successful or not (S1014).

If the pass setting has failed, the storage management server 30 notifies the administrator or the like, which is the request source for the pass setting, of the failure of the path setting (S1019). For example, the storage management server 30 displays information on the failure of the path setting. Then, the storage management server 30 finishes the path setting process.

On the other hand, if the path setting has been successful, the storage management server 30, based on the received path setting results, updates the management server path management table 326. Specifically, the storage management server 30 adds new records to the management server path management table 326. Then, the storage management server 30 stores the information on the path configuration included in the received path setting results in the created new records.

Then, the storage management server 30 executes a storage certificate distribution process (S1015). It should be noted that a detailed description will be given of the storage certificate distribution process with reference to FIG. 10.

Then, the storage management server 30 executes a host certificate distribution process (S1016). It should be noted that a detailed description will be given of the host certificate distribution process with reference to FIG. 11.

Moreover, the storage management server 30 transmits the information on the path configuration included in the received path setting result in the step S1013 to the host computers 10 (S1017).

Then, the storage management server 30 notifies the administrator or the like, who is the request source of the path setting, of the successful path setting. For example, the storage management server 30 displays information on the successful path setting (S1018). Then, the storage management server 30 finishes the path setting process.

Figure 10:
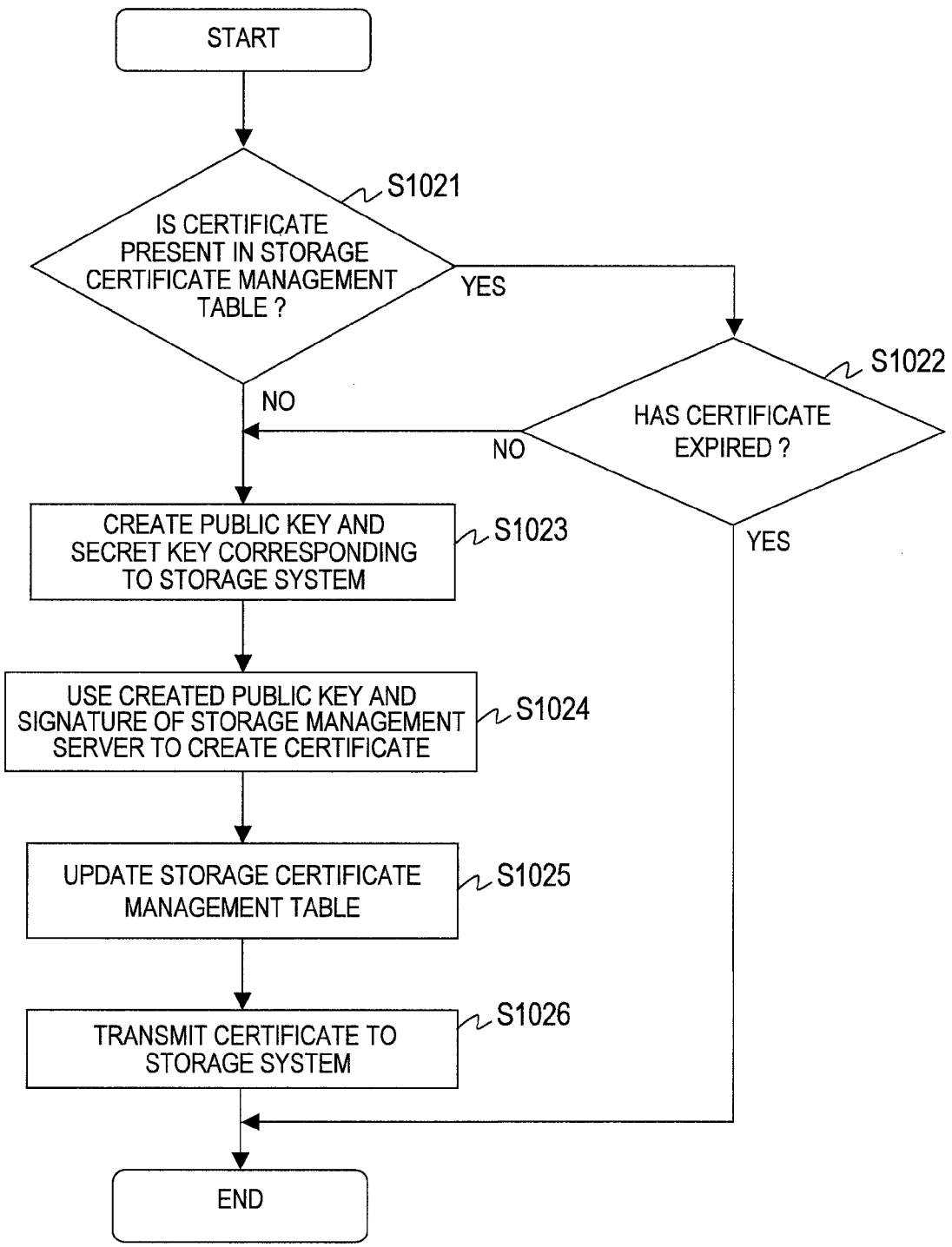
FIG. 10 is a flowchart of a storage certificate distribution process by the storage management server according to the embodiment of this invention.

FIG. 10 is a flowchart of the storage certificate distribution process by the storage management server 30 according to the embodiment of this invention.

Figure 12:
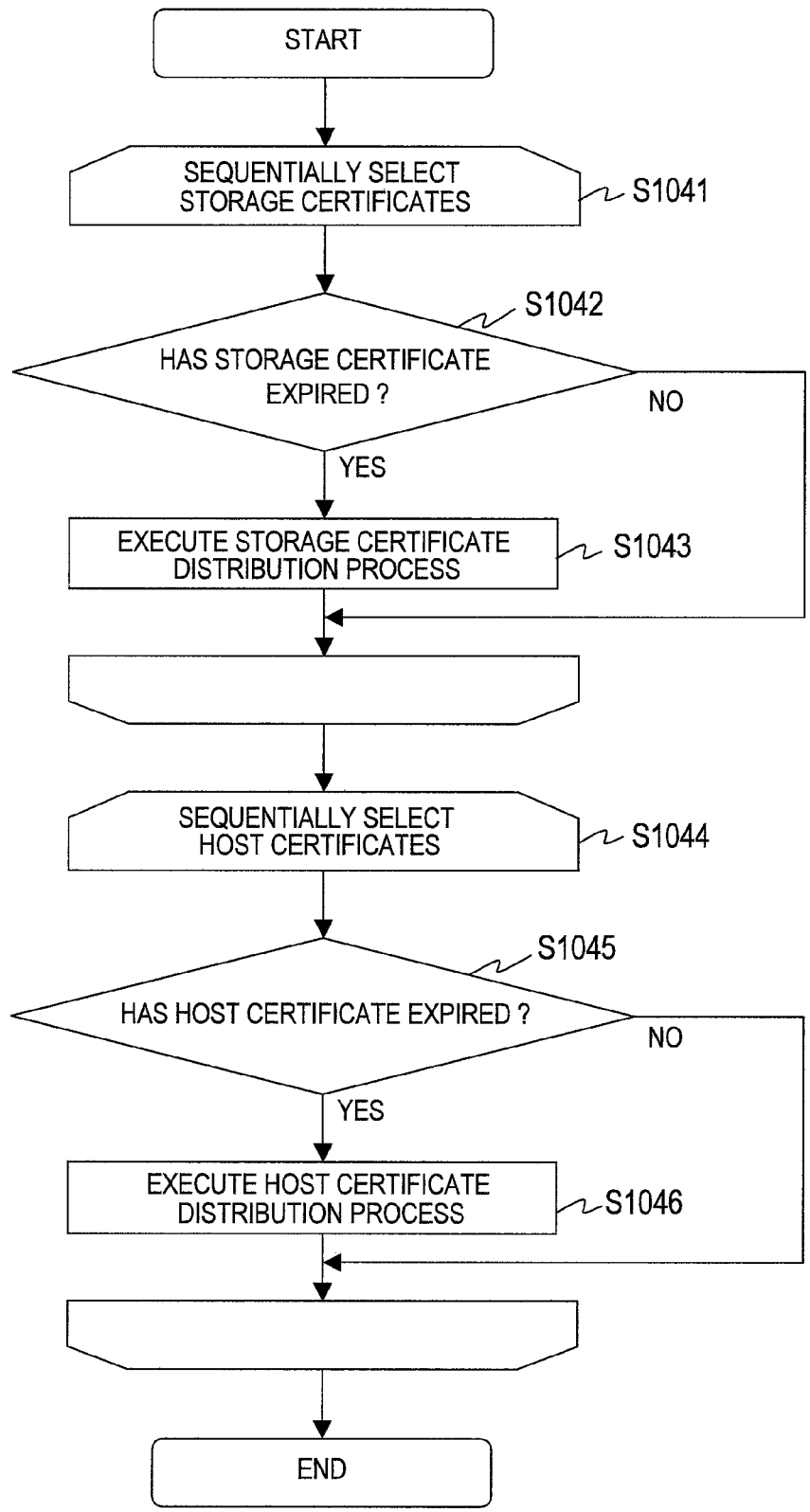
FIG. 12 is a flowchart of a certificate update process by the storage management server according to the embodiment of this invention.

The storage certificate distribution process is executed in the step S1015 of the path setting process as shown in FIG. 9, and in a step S1043 of a certificate update process as shown in FIG. 12.

If the storage certificate distribution process is executed in the step S1015 of the path setting process as shown in FIG. 9, the storage management server 30 sequentially selects all the storage systems 20. Then, the storage management server 30 executes the storage certificate distribution process for the each selected storage system 20.

Figure 14:
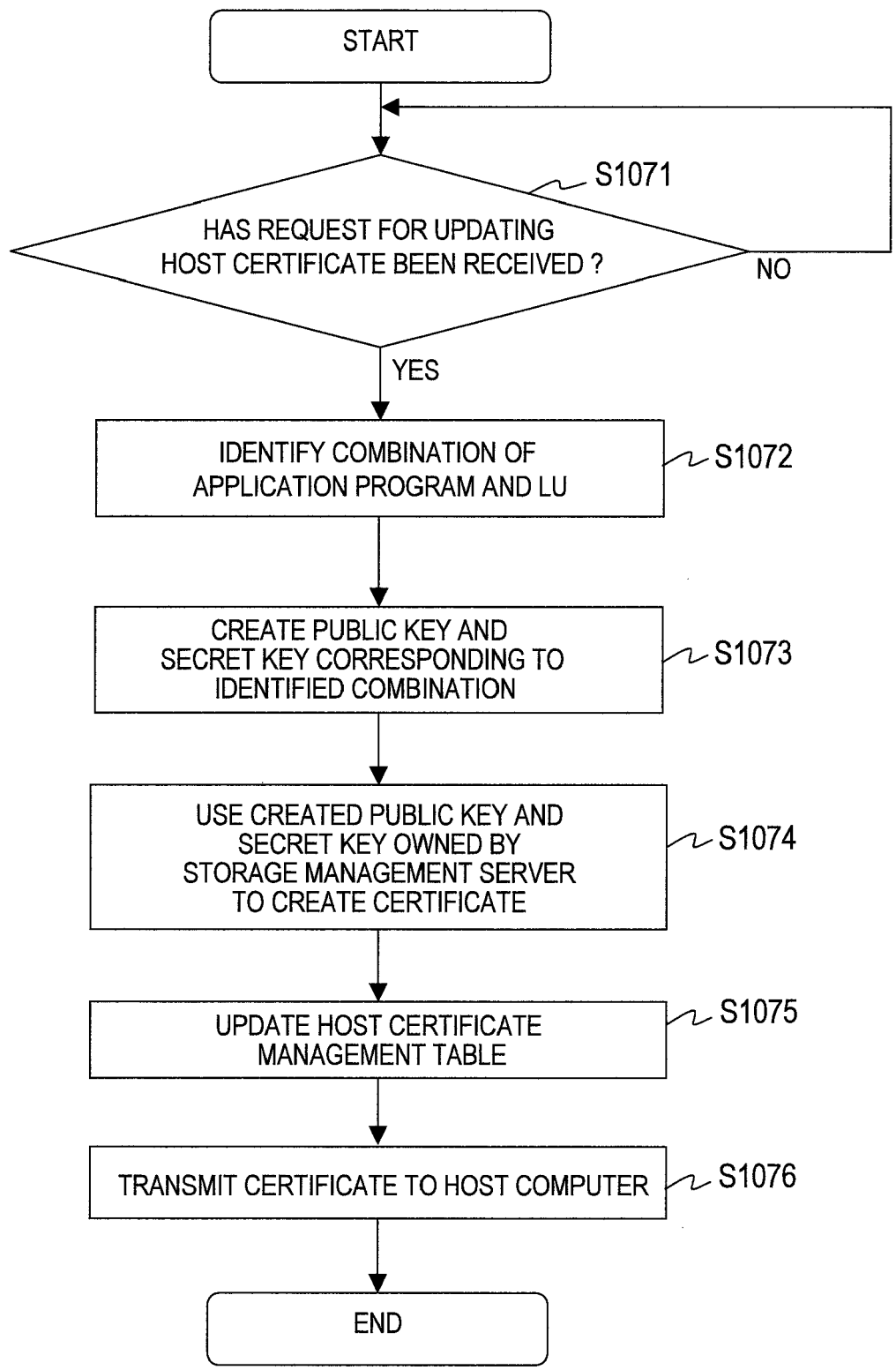
FIG. 14 is a flowchart of a host certificate update process by the storage management server according to the embodiment of this invention.

On the other hand, if the storage certificate distribution process is executed in the step S1043 of the path setting process as shown in FIG. 14, the storage management server 30 selects a storage system 20 corresponding to a certificate selected in a step S1041.

The storage management server 30 determines whether a certificate corresponding to the selected storage system 20 is present in the storage certificate management table 324 (S1021).

Specifically, the storage management server 30 selects a record whose storage system name 3241 matches with the identifier of the selected storage system 20 from the storage certificate management table 324.

If the storage management server 30 cannot select the record from the storage certificate management table 324, the storage management server 30 determines that a certificate corresponding to the selected storage system 20 is not present in the storage certificate management table 324. In this case, the storage management server 30 directly proceeds to a step S1023.

On the other hand, if the storage management server 30 can select the record from the storage certificate management table 324, the storage management server 30 determines that a certificate corresponding to the selected storage system 20 is present in the storage certificate management table 324. In this case, the storage management server 30 determines whether the certificate corresponding to the selected storage system 20 has expired (S1022).

Specifically, the storage management server 30 extracts the expiration date 3245 from the record selected from the storage certificate management table 324. Then, the storage management server 30 determines whether the extracted expiration date 3245 has passed.

If the expiration date 3245 has not passed, the storage management server 30 does not have to create a certificate corresponding to the selected storage system 20. Thus, the storage management server 30 immediately finishes the storage certificate distribution process.

On the other hand, if the expiration date 3245 has passed, the storage management server 30 proceeds to a step S1023. If the expiration date 3245 is within a certain period from the present time, the storage management server 30 may proceed to the step S1023. In this case, when the expiration date of a certificate is near, the storage management server 30 updates the certificate.

Then, the storage management server 30 creates a public key and a secret key for the selected storage system 20 (S1023).

Then, the storage management server 30 uses the created public key and a signature of the storage management server 30 to create a certificate for the selected storage system 20 (S1024).

Then, the storage management server 30 updates the storage certificate management table 324 (S1025).

Specifically, the storage management server 30 selects a record whose storage system name 3241 matches with the identifier of the selected storage system 20 from the storage certificate management table 324.

If the storage management server 30 cannot select such a record, the storage management server 30 creates a new record in the storage certificate management table 324. Then, the storage management server 30 stores the identifier of the selected storage system 20 in the storage system name 3241 of the new record. Then, the storage management server 30 handles the new record as a record selected from the storage certificate management table 324.

Then, the storage management server 30 stores the public key created in the step S1023 in the public key 3242 of the selected record. Then, the storage management server 30 stores the secret key created in the step S1023 in the secret key 3243 of the selected record.

Then, the storage management server 30 stores the certificate created in the step S1024 in the storage certificate 3244 of the selected record. Then, the storage management server 30 stores the expiration date of the certificate created in the step S1024 in the expiration date 3245 of the selected record.

In this way, the storage management server 30 updates the storage certificate management table 324. Then, the storage management server 30 transmits the certificate created in the step S1024 to the selected storage system 20 (S1026). Then, the storage management server 30 finishes the storage certificate distribution process.

Figure 11:
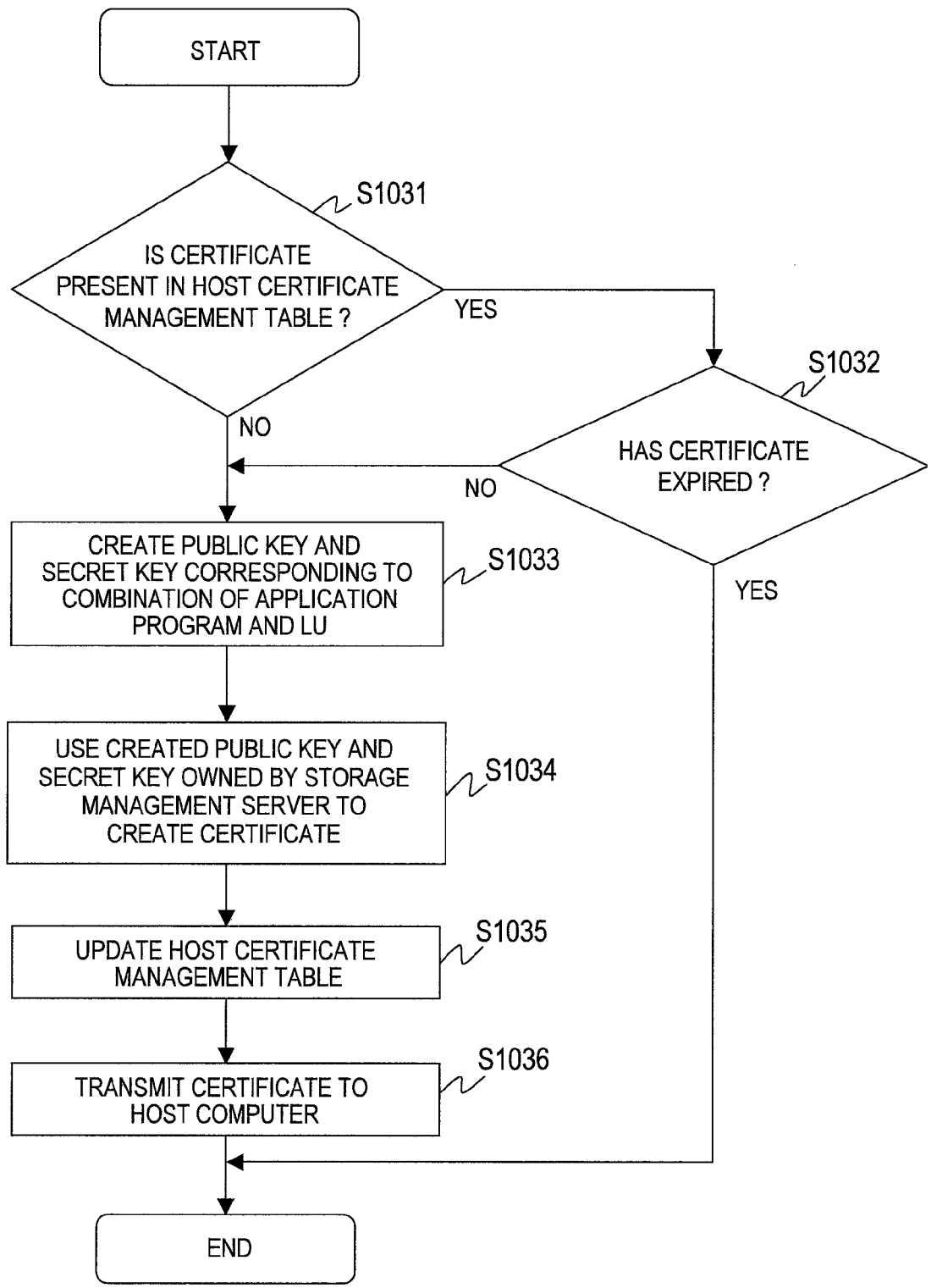
FIG. 11 is a flowchart of a host certificate distribution process by the storage management server according to the embodiment of this invention.

FIG. 11 is a flowchart of the host certificate distribution process by the storage management server 30 according to the embodiment of this invention.

The host certificate distribution process is executed in the step S1016 of the path setting process as shown in FIG. 9, and in a step S1046 of the certificate update process as shown in FIG. 12.

When the host certificate distribution process is executed in the step S1016 of the path setting process as shown in FIG. 9, the storage management server 30 sequentially selects all the combinations of an application program 121 included in the host computer 10 and an LU 25 accessed by the application program 121. In other words, the storage management server 30 sequentially selects all the combinations of an application program 121 which is to be an access source and an LU 25 which is to be an access destination. Then, the storage management server 30 executes the host certificate distribution process for the respective selected combinations.

On the other hand, if the host certificate distribution process is executed in the step S1046 of the certificate update process as shown in FIG. 12, the storage management server 30 selects a combination corresponding to a certificate selected in a step S1044.

The storage management server 30 determines whether a certificate corresponding to the selected combination is present in the host certificate management table 323 (S1031).

Specifically, the storage management server 30 selects records whose host name 3231 matches the identifier of the host computer 10 provided with the application program 121 included in the selected combination from the host certificate management table 323. Then, the storage management server 30 selects records whose application program name 3232 matches with the identifier of the application program 121 included in the selected combination from the selected records.

Then, the storage management server 30 selects records whose storage system name 3233 matches with the identifier of a storage system 20 providing the LU 25 included in the selected combination from the selected records. Further, the storage management server 30 selects a record whose LUN 3234 matches with the identifier of the LU 25 included in the selected combination from the selected records.

In the case where the storage management server 30 is not able to select the record from the host certificate management table 323, the storage management server 30 determines that a certificate corresponding to the selected combination is not present in the host certificate management table 323. In this case, the storage management server 30 directly proceeds to a step S1033.

In the case where the storage management server 30 is able to select the record from the host certificate management table 323, the storage management server 30 determines that a certificate corresponding to the selected combination is present in the host certificate management table 323. In this case, the storage management server 30 determines whether the certificate corresponding to the selected combination has expired (S1032).

Specifically, the storage management server 30 extracts the expiration date 3238 from the record selected from the host certificate management table 323. Then, the storage management server 30 determines whether the extracted expiration date 3238 has passed.

If the expiration date 3238 has not passed, the storage management server 30 does not have to create a certificate corresponding to the selected combination. Thus, the storage management server 30 immediately finishes the host certificate distribution process.

On the other hand, if the expiration date 3238 has passed, the storage management server 30 proceeds to a step S1033. If the expiration date 3238 is within a certain period from the present time, the storage management server 30 may proceed to the step S1033. In this case, when the expiration date of a certificate is near, the storage management server 30 updates the certificate.

Then, the storage management server 30 creates a public key and a secret key for the selected combination (S1033).

Then, the storage management server 30 uses the created public key and a secret key owned by the storage management server 30 to create a certificate corresponding to the selected combination (S1034).

Then, the storage management server 30 updates the host certificate management table 323 (S1035).

Specifically, the storage management server 30 selects records whose host name 3231 matches with the identifier of the host computer 10 provided with the application program 121 included in the selected combination from the host certificate management table 323. Then, the storage management server 30 selects records whose application program name 3232 matches with the identifier of the application program 121 included in the selected combination from the selected records.

Then, the storage management server 30 selects records whose storage system name 3233 matches with the identifier of the storage system 20 providing the LU 25 included in the selected combination from the selected records. Further, the storage management server 30 selects a record whose LUN 3234 matches with the identifier of the LU 25 included in the selected combination from the selected records.

If the storage management server 30 cannot select the record, the storage management server 30 creates a new record in the host certificate management table 323. Then, the storage management server 30 stores the identifier of the host computer 10 provided with the application program 121 included in the selected combination in the host name 3231 of the new record. Then, the storage management server 30 stores the identifier of the application program 121 included in the selected combination in the application program name 3232 of the new record.

Then, the storage management server 30 stores the identifier of the storage system 20 providing the LU 25 included in the selected combination in the storage system name 3233 of the new record. Then, the storage management server 30 stores the identifier of the LU 25 included in the selected combination in the LUN 3234 of the new record. Then, the storage management server 30 handles the new record as a record selected from the host certificate management table 323.

Then, the storage management server 30 stores the public key created in the step S1033 in the public key 3235 of the selected record. Then, the storage management server 30 stores the secret key created in the step S1033 in the secret key 3236 of the selected record.

Then, the storage management server 30 stores the certificate created in the step S1034 in the host certificate 3237 of the selected record. Then, the storage management server 30 stores the expiration date of the certificate created in the step S1034 in the expiration date 3238 of the selected record.

In this way, the storage management server 30 updates the host certificate management table 323. Then, the storage management server 30 transmits the certificate created in the step S1034 to the host computer 10 provided with the application program 121 included in the selected combination (S1036). Then, the storage management server 30 finishes the host certificate distribution process.

FIG. 12 is a flowchart of the certificate update process by the storage management server 30 according to the embodiment of this invention.

The storage management server 30 executes the certificate update process at a predetermined interval.

First, the storage management server 30 sequentially selects all certificates (storage certificates) distributed to a storage system 20 (S1041).

Specifically, the storage management server 30 sequentially selects records from the top of the storage certificate management table 324.

Then, the storage management server 30 determines whether the selected certificate has expired (S1042).

Specifically, the storage management server 30 extracts the expiration date 3245 from the record selected from the storage certificate management table 324. Then, the storage management server 30 determines whether the extracted expiration date 3245 has passed.

If the expiration date 3245 has not passed, the storage management server 30 does not have to update the selected certificate. Then, the storage management server 30 determines whether all the certificates distributed to the storage system 20 have been selected in the step S1041.

If all the certificates have been selected, the storage management server 30 proceeds to a step S1044. On the other hand, if any certificates have not been selected, the storage management server 30 returns to the step S1041. Then, the storage management server 30 repeats the same process until all the certificates distributed to the storage system 20 have been selected.

On the other hand, if the expiration date 3245 has passed, the storage management server 30 executes the storage certificate distribution process shown in FIG. 10 (S1043). If the expiration date 3245 is within a certain period from the present time, the storage management server 30 may execute the storage certificate distribution process. In this case, when the expiration date of a certificate is near, the storage management server 30 updates the certificate.

Then, the storage management server 30 determines whether all the certificates distributed to the storage system 20 have been selected in the step S1041.

If any certificates have not been selected, the storage management server 30 returns to the step S1041. Then, the storage management server 30 repeats the same process until all the certificates distributed to the storage system 20 have been selected. On the other hand, if all the certificates have been selected, the storage management server 30 proceeds to the step S1044.

Then, the storage management server 30 sequentially selects all the certificates (host certificates) distributed to the host computer 10 (S1044).

Specifically, the storage management server 30 sequentially selects records from the top of the host certificate management table 323.

Then, the storage management server 30 determines whether the selected certificate has expired (S1045).

Specifically, the storage management server 30 extracts the expiration date 3238 from the record selected from the host certificate management table 323. Then, the storage management server 30 determines whether the extracted expiration date 3238 has passed.

If the expiration date 3238 has not passed, the storage management server 30 does not have to update the selected certificate. Then, the storage management server 30 determines whether all the certificates distributed to the host computer 10 have been selected in the step S1044.

If all the certificates have been selected, the storage management server 30 immediately finishes the certificate update process. On the other hand, if any certificates have not been selected, the storage management server 30 returns to the step S1044. Then, the storage management server 30 repeats the same process until all the certificates distributed to the host computer 10 have been selected.

On the other hand, if the expiration date 3238 has passed, the storage management server 30 executes the host certificate distribution process shown in FIG. 11 (S1046). If the expiration date 3238 is within a certain period from the present time, the storage management server 30 may execute the host certificate distribution process. In this case, when the expiration date of a certificate is near, the storage management server 30 updates the certificate.

Then, the storage management server 30 determines whether all the certificates distributed to the host computer 10 have been selected in the step S1044.

If any certificates have not been selected, the storage management server 30 returns to the step S1044. Then, the storage management server 30 repeats the same process until all the certificates distributed to the host computer 10 have been selected. On the other hand, if all the certificates have been selected, the storage management server 30 finishes the certificate update process.

As described above, the storage management server 30 periodically monitors the expiration dates of the certificates. If an expiration date of a certificate is reached, or is near, the storage management server 30 distributes the certificate again.

Figure 13:
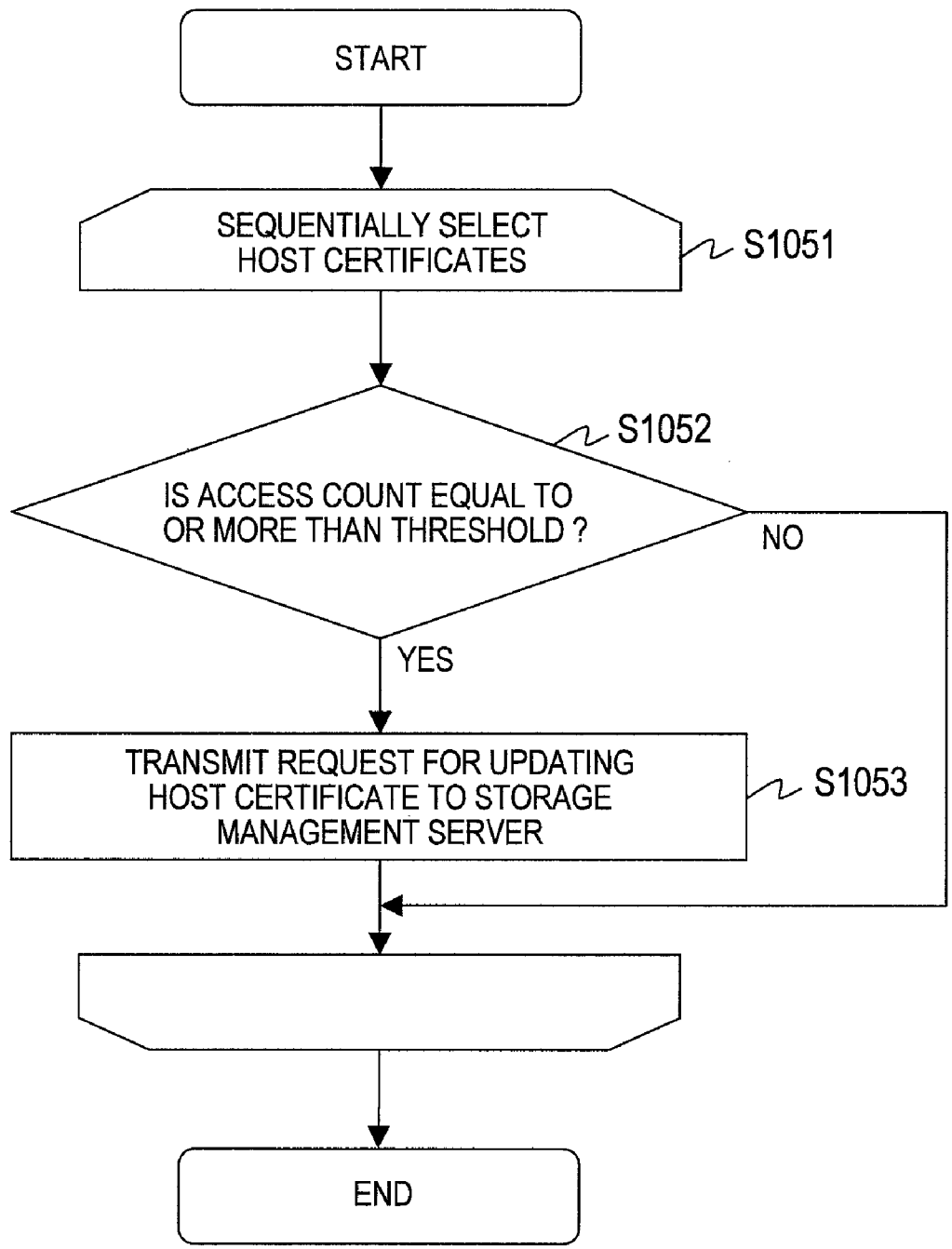
FIG. 13 is a flowchart of an access count monitoring process by the host computer according to the embodiment of this invention.

FIG. 13 is a flowchart of the access count monitoring process by a host computer 10 according to the embodiment of this invention.

The host computer 10 executes the access count monitoring process at a predetermined interval. Moreover, the access count monitoring process is executed by the storage area access control unit 124 included in the host computer 10.

First, the host computer 10 sequentially selects all certificates (host certificates) distributed to the host computer 10 (S1051).

Specifically, the host computer 10 sequentially selects records from the top of the certificate management table 122.

Then, the host computer 10 determines whether the number of accesses corresponding to the selected certificate is equal to or more than a threshold or not (S1052). The number of accesses corresponding to a certificate is the number of accesses from an application program 121 corresponding to the certificate to an LU 25 corresponding to the certificate after the distribution of the certificate.

Specifically, the host computer 10 extracts the access count 1225 from the record selected from the certificate management table 122. Then, the host computer 10 determines whether the extracted access count 1225 is equal to or more than a threshold or not.

If the access count 1225 is less than the threshold, it is not necessary to update the selected certificate. Then, the host computer 10 determines whether all the certificates distributed to the host computer 10 have been selected in the step S1051.

If all the certificates have been selected, the host computer 10 immediately finishes the access count monitoring process. On the other hand, if there is any certificate that has not been selected, the host computer 10 returns to the step S1051. Then, the host computer 10 repeats the same process until all the certificates distributed to the host computer 10 have been selected.

On the other hand, if the access count 1225 is equal to or more than the threshold, it is necessary to update the selected certificate. Then, the host computer 10 transmits a request for updating the host certificate to the storage management server 30 (S1053). It should be noted that the storage management server 30, upon receiving the request for updating the host certificate, executes a host certificate update process. It should be noted that a detailed description will be given of the host certificate update process with reference to FIG. 14.

Moreover, a request for updating a host certificate includes information on combination corresponding to the certificate for which the update is requested. The information on the combination corresponding to the certificate includes the identifier of an application program 121, which is to be an access source, and the identifier of an LU 25, which is to be an access destination, for example.

Then, the host computer 10 determines whether all the certificates distributed to the host computer 10 have been selected in the step S1051.

If there is any certificate that has not been selected, the host computer 10 returns to the step S1051. Then, the host computer 10 repeats the same process until all the certificates distributed to the host computer 10 have been selected. On the other hand, if all the certificates have been selected, the host computer 10 immediately finishes the access count monitoring process.

As described above, the host computer 10 monitors the number of accesses from an application program 121 to an LU 25. If the number of the accesses exceeds the threshold, the host computer 10 requests the storage management server 30 for updating the certificate.

It should be noted that the storage management server 30, in place of a host computer 10, may monitor the number of accesses from an application program 121 to an LU 25. In this case, the storage management server 30 determines whether the access count 3239 of the host certificate management table 323 is equal to or more than the threshold or not.

If the access count 3239 is equal to or more than the threshold, the storage management server 30 executes the host certificate distribution process as shown in FIG. 11. With the execution as described above, the storage management server 30 updates host certificates distributed to a host computer 10.

FIG. 14 is a flowchart of the host certificate update process by the storage management server 30 according to the embodiment of this invention.

Figure 17:
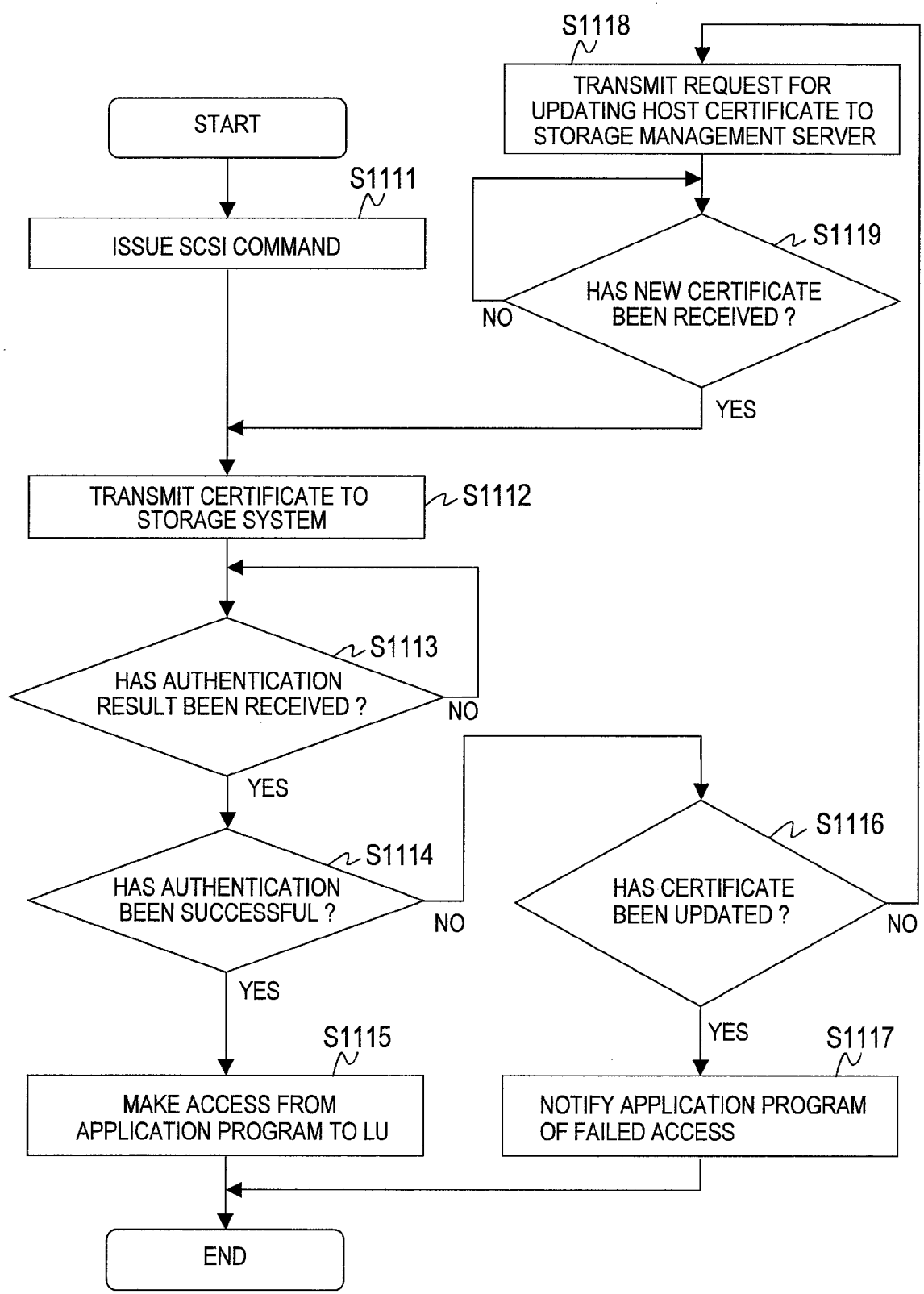
FIG. 17 is a flowchart of the access execution process by the host computer according to the embodiment of this invention.

First, the storage management server 30 determines whether a request for updating a host certificate has been received from a host computer 10 (S1071). For example, the storage management server 30 receives a request for updating a host certificate in the step S1053 of the access count monitoring process as shown in FIG. 13 executed by a host computer 10. In addition, the storage management server 30 receives a request for updating a host certificate in a step S1118 of an access execution process as shown in FIG. 17 executed by a host computer 10.

In a case where a request for updating a host certificate is not received, the storage management server 30 waits until reception of the request for updating the host certificate.

On the other hand, upon receiving a request for updating a host certificate, the storage management server 30 identifies a combination corresponding to the certificate whose update is requested. In other words, the storage management server 30 identifies a combination of an application program 121, which is to be an access source, and an LU 25, which is to be an access destination (S1072).

Then, the storage management server 30 creates a public key and a secret key for the identified combination (S1073).

Then, the storage management server 30 uses the created public key and a secret key owned by the storage management server 30 to newly create a certificate corresponding to the identified combination (S1074).

Then, the storage management server 30 updates the host certificate management table 323 (S1075).

Specifically, the storage management server 30 selects records whose host name 3231 matches with the identifier of a host computer 10 provided with the application program 121 included in the identified combination from the host certificate management table 323. Then, the storage management server 30 selects records whose application program name 3232 matches with the identifier of the application program 121 included in the identified combination from the selected records.

Then, the storage management server 30 selects records whose storage system name 3233 matches with the identifier of a storage system 20 providing the LU 25 included in the identified combination from the selected records. Further, the storage management server 30 selects a record whose LUN 3234 matches with the identifier of the LU 25 included in the identified combination from the selected records.

Then, the storage management server 30 stores the public key created in the step S1073 in the public key 3235 of the selected record. Then, the storage management server 30 stores the secret key created in the step S1073 in the secret key 3236 of the selected record.

Then, the storage management server 30 stores the certificate created in the step S1074 in the host certificate 3237 of the selected record. Then, the storage management server 30 stores the expiration date of the certificate created in the step S1074 in the expiration date 3238 of the selected record.

In this way, the storage management server 30 updates the host certificate management table 323. Then, the storage management server 30 transmits the certificate created in the step S1074 to the host computer 10, which is the transmission source of the received host certificate update request (S1076). Then, the storage management server 30 finishes the host certificate update process.

As described above, the storage management server 30, upon being requested for updating a certificate by a host computer 10, updates the certificate.

Figure 15:
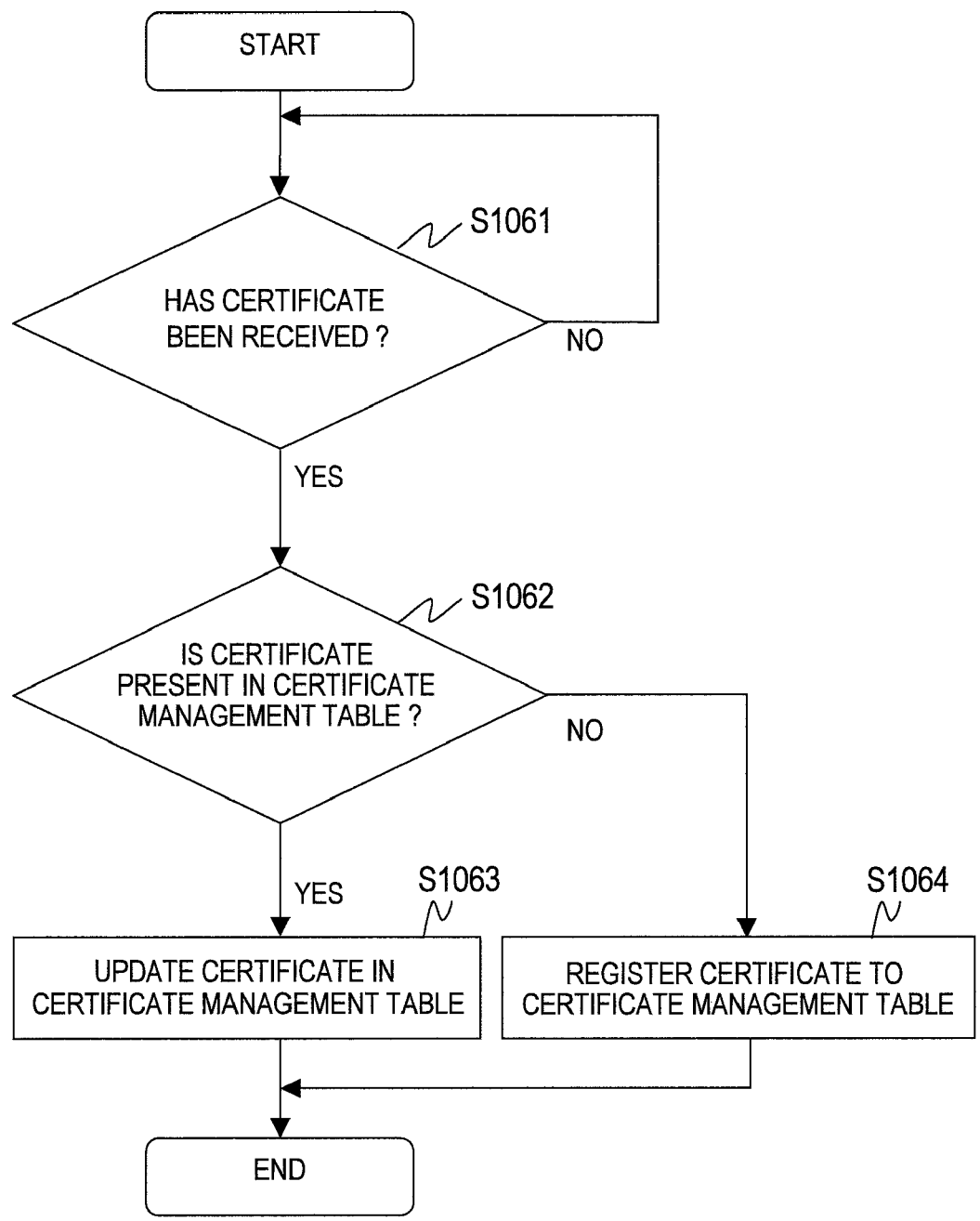
FIG. 15 is a flowchart of a certificate reception process by the host computer according to the embodiment of this invention.

FIG. 15 is a flowchart of a certificate reception process by a host computer 10 according to the embodiment of this invention.

The host computer 10 determines whether a certificate has been received from the storage management server 30 (S1061). For example, the host computer 10 receives a certificate in the step S1036 of the host certificate distribution process as shown in FIG. 11 executed by the storage management server 30, or in the step S1076 of the host certificate update process as shown in FIG. 14 executed by the storage management server 30.

If a certificate has not been received, the host computer 10 waits until the certificate is received. On the other hand, if a certificate has been received, the host computer 10 determines whether there is a certificate whose combination is the same as that of the received certificate in the certificate management table 122 (S1062).

Specifically, the host computer 10 identifies a combination corresponding to the received certificate. Then, the host computer 10 selects records whose application program name 1221 matches with the identifier of an application program 121 included in the identified combination from the certificate management table 122.

Then, the host computer 10 selects records whose storage system name 1222 matches with the identifier of a storage system 20 providing an LU 25 included in the identified combination from the selected records. Further, the host computer 10 selects a record whose LUN 1223 matches with the identifier of the LU 25 included in the selected combination from the selected records.

Upon being able to select such a record from the certificate management table 122, the host computer 10 determines that a certificate corresponding to the same combination as the received certificate is present in the certificate management table 122.

In this case, the host computer 10 updates the certificate 1224 of the selected record (S1063). Specifically, the host computer 10 stores the received certificate in the certificate 1224 of the selected record. Further, the host computer 10 stores "0" in the access count 1225 of the selected record.

Then, the host computer 10 finishes the certificate reception process.

On the other hand, in a case of being unable to select such a record from the certificate management table 122, the host computer 10 determines that a certificate corresponding to the same combination as the received certificate is not present in the certificate management table 122.

In this case, the host computer 10 registers the received certificate to the certificate management table 122 (S1064).

Specifically, the host computer 10 adds a new record to the certificate management table 122. Then, the host computer 10 stores the identifier of the application program 121 included in the identified combination in the application program name 1221 of the new record. Then, the host computer 10 stores the identifier of the storage system 20 providing the LU 25 included in the identified combination in the storage system name 1222 of the new record. Then, the host computer 10 stores the identifier of the LU 25 included in the identified combination in the LUN 1223 of the new record.

Then, the host computer 10 stores the received certificate in the certificate 1224 of the new record. Then, the host computer 10 stores "0" in the access count 1225 of the new record.

Then, the host computer 10 finishes the certificate reception process.

Figure 16:
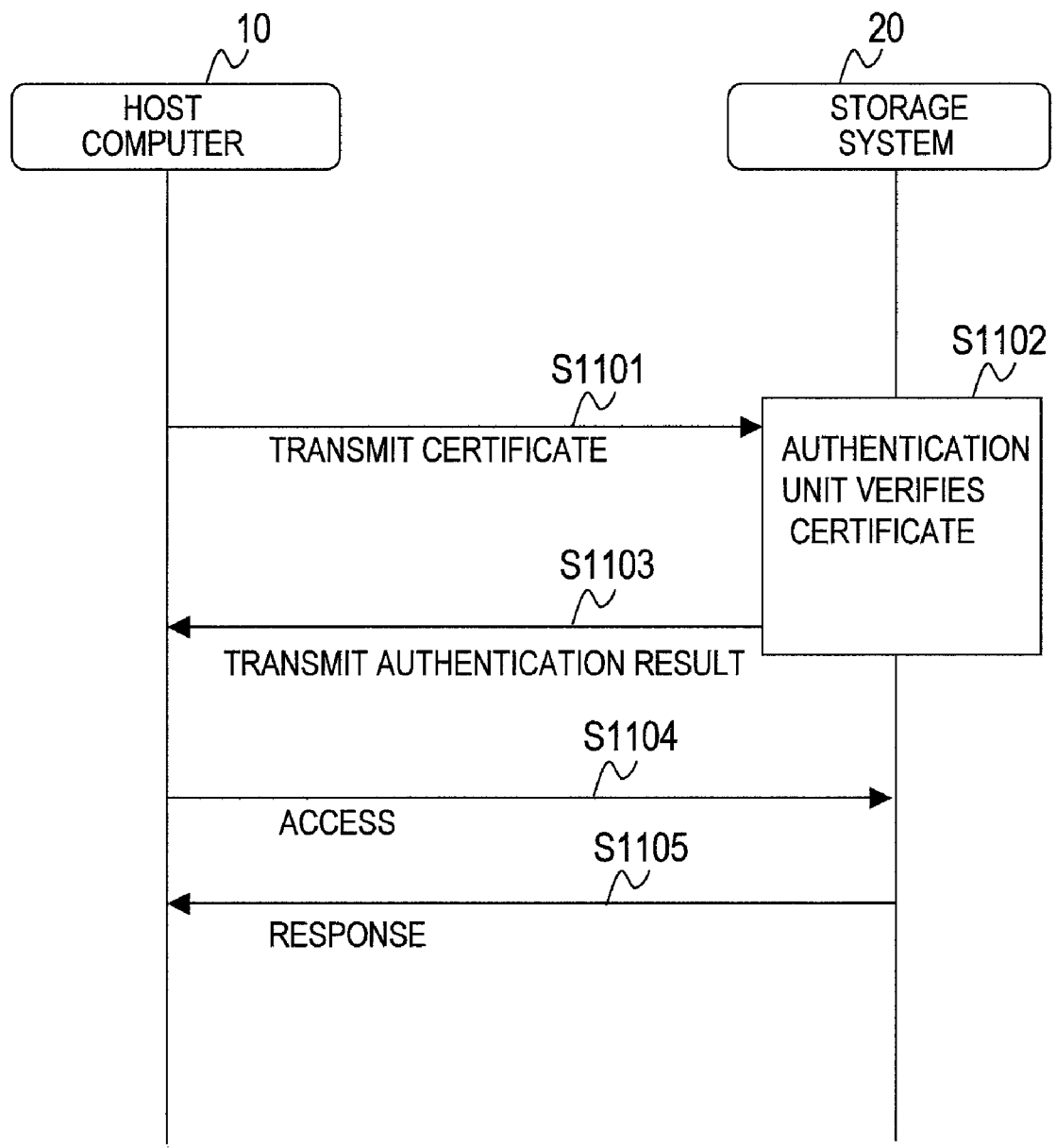
FIG. 16 is a sequence diagram of an access execution process of the computer system according to the embodiment of this invention.

FIG. 16 is a sequence diagram of the access execution process of the computer system according to the embodiment of this invention.

First, an application program 121 included in a host computer 10 issues a SCSI command to a storage system 20. The SCSI command requests an access to an LU 25 provided by the storage system 20.

Then, the storage area access control unit 124 included in the host computer 10 extracts a certificate corresponding to a combination of the application program 121, which is an issuer of the SCSI command, and the LU 25, which is to be an access destination of the SCSI command, from the certificate management table 122.

Then, the storage area access control unit 124 included in the host computer 10 transmits the extracted certificate to the storage system 20 (S1101).

The authentication unit 231 included in the storage system 20 receives the certificate from the host computer 10. Then, the authentication unit 231 included in the storage system 20 verifies the received certificate (S1102). Upon successfully verifying the received certificate, the authentication unit 231 included in the storage system 20 transmits an authentication result indicating the successful authentication (S1103).

The storage area access control unit 124 included in the host computer 10 receives the authentication result. When the received authentication result indicates the successful authentication, the storage area access control unit 124 included in the host computer 10 permits an access from the application program 121 to the LU 25 (S1104). In other words, the storage area access control unit 124 included in the host computer 10 transmits the SCSI command issued by the application program 121 to the storage system 20.

Then, the storage system 20 receives the SCSI command issued by the application program 121 from the host computer 10. Then, the storage system 20 transmits a response to the received SCSI command to the host computer 10 (S1105).

Then, the application program 121 included in the host computer 10 receives the response to the SCSI command from the storage system 20. Then, the access execution process ends in the computer system.

FIG. 17 is a flowchart of the access execution process by a host computer 10 according to the embodiment of this invention.

When an application program 121 included in the host computer 10 issues a SCSI command to a storage system 20 (S1111), the host computer 10 executes the access execution process.

First, the storage area access control unit 124 included in the host computer 10 extracts a certificate corresponding to a combination of the application program 121, which is an issuer of the SCSI command, and an LU 25, which is to be an access destination of the SCSI command, from the certificate management table 122.

Specifically, the storage area access control unit 124 included in the host computer 10 selects records whose application program name 1221 matches with the identifier of the application program 121, which is the issuer of the SCSI command, from the certificate management table 122. Then, the storage area access control unit 124 included in the host computer 10 selects records whose storage system name 1222 matches with the identifier of the storage system 20, which is the transmission destination of the SCSI command, from the selected records. Then, the storage area access control unit 124 included in the host computer 10 selects a record whose LUN 1223 matches with the identifier of the LU 25, which is to be the access destination of the SCSI command, from the selected records.

Then, the storage area access control unit 124 included in the host computer 10 extracts the certificate 1224 from the selected record. Then, the storage area access control unit 124 included in the host computer 10 transmits the extracted certificate 1224 to the storage system 20 (S1112). The storage system 20, upon receiving the certificate from the host computer 10, executes an authentication process. It should be noted that a detailed description will be given of the authentication process with reference to FIG. 21. By executing the authentication process, the storage system 20 transmits an authentication result to the host computer 10.

On the other hand, the storage area access control unit 124 included in the host computer 10 determines whether an authentication result has been received from the storage system 20 (S1113).

If an authentication result has not been received, the storage area access control unit 124 included in the host computer 10 waits until the authentication result is received. Moreover, in a case where an authentication result has not been received for more than a predetermine period, the storage area access control unit 124 included in the host computer 10 transmits the extracted authentication 1224 to the storage system 20 via a different path.

On the other hand, upon receiving an authentication result, the storage area access control unit 124 included in the host computer 10 determines whether the received authentication result indicates a successful authentication (S1114).

When the authentication result indicates a successful authentication, the storage area access control unit 124 included in the host computer 10 permits an access from the application program 121 to the LU 25. In other words, the storage area access control unit 124 included in the host computer 10 transmits the SCSI command issued by the application program 121 to the storage system 20. As a result, the host computer 10 makes the access from the application program 121 to the LU 25 (S1115).

Moreover, the host computer 10 may notify a user of the successful access from the application program 121 to the LU 25. For example, the host computer 10 shows an access monitor 17. Then, the host computer 10 finishes the access execution process.

Figure 18:
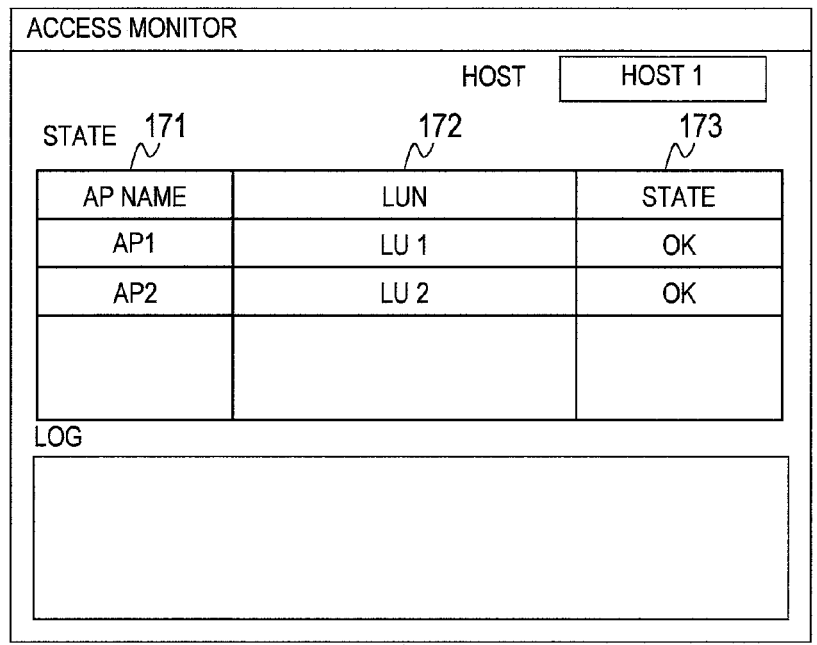
FIG. 18 is an access monitor shown on the host computer according to the embodiment of this invention.

FIG. 18 shows the access monitor 17 shown on a host computer 10 according to the embodiment of this invention.

The access monitor 17 is shown if the host computer 10 receives an authentication result indicating a successful authentication. Thus, the access monitor 17 shows that an access from an application program 121 to an LU 25 is possible.

Moreover, the access monitor 17 includes an access state management table. The access state management table includes application program names 171, LUN's 172, and states 173.

An application program name 171 is a unique identifier for an application program 121 included in the host computer 10. An LUN 172 is a unique identifier of an LU 25 accessed by the application program 121 identified by the application program name 171 of the record.

A state 173 shows a state of access from the application program 121 identified by the application program name 171 of the record to the LU 25 identified by the LUN 172 of the record.

If the state 173 contains "OK", the access from the application program 121 identified by the application program name 171 of the record to the LU 25 identified by the LUN 172 of the record is possible. If the state 173 contains "NG", the access from the application program 121 identified by the application program name 171 of the record to the LU 25 identified by the LUN 172 of the record is not possible. If the state 173 contains "unknown", the access from the application program 121 identified by the application program name 171 of the record to the LU 25 identified by the LUN 172 of the record is in an unknown state.

FIG. 17 will now be referred again.

If the authentication result indicates a failed authentication in the step S114, the storage area access control unit 124 included in the host computer 10 determines whether a certificate has been updated in the access execution process (S116). Specifically, the storage area access control unit 124 included in the host computer 10 determines whether the step S1118 and a step S1119 have been executed.

Upon determining that the certificate has been updated, the storage area access control unit 124 included in the host computer 10 notifies the application program 121 of a failure of the access requested by the SCSI command (S1117).

Moreover, the host computer 10 may notify the user of the failed access from the application program 121 to the LU 25. For example, the host computer 10 shows an access monitor 18. Then, the host computer 10 finishes the access execution process.

Figure 19:
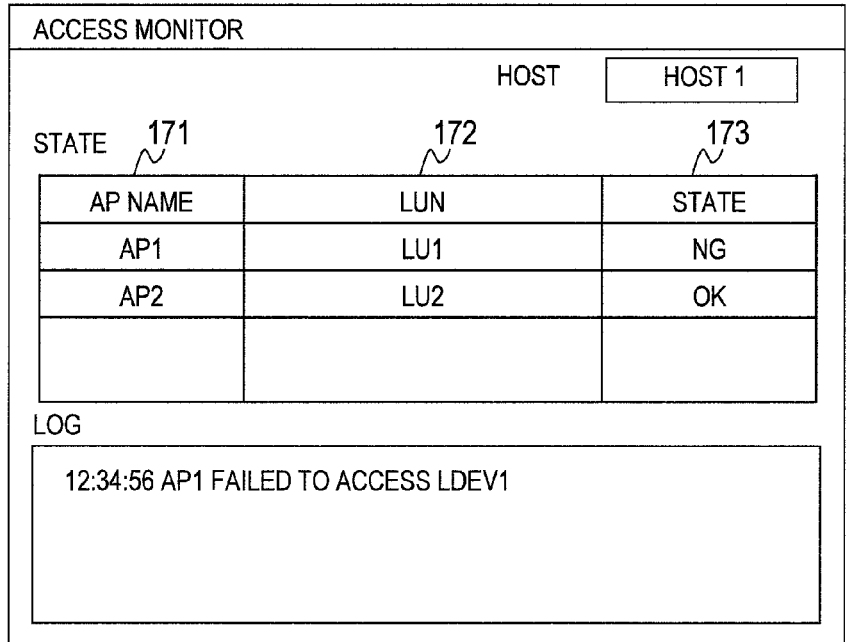
FIG. 19 is an access monitor shown on the host computer according to the embodiment of this invention.

FIG. 19 is the access monitor 18 shown on the host computer 10 according to the embodiment of this invention.

This access monitor 18 is shown if the host computer 10 receives an authentication result indicating a failed authentication. Thus, the access monitor 18 shows that an access from an application program 121 to an LU 25 is not possible.

Moreover, the access monitor 18 includes an access state management table. The access state management table is the same as that included in the access monitor 17 described with reference to FIG. 18, and a detailed description thereof, therefore, is omitted.

FIG. 17 will now be referred again.

Upon determining that the certificate has not been updated in the step S116, the storage area access control unit 124 included in the host computer 10 transmits a request for updating the host certificate to the storage management server 30 (S1118). It should be noted that the storage management server 30, upon receiving the request for updating the host certificate, executes the host certificate update process shown in FIG. 14. Moreover, a request for updating a host certificate includes information on the combination corresponding to the certificate for which the update is requested. The information on the combination corresponding to the certificate includes the identifier of an application program 121, which is to bean access source, and the identifier of an LU 25, which is to be an access destination, for example.

In this case, the host computer 10 may notify the user of the unknown state of the access from the application program 121 to the LU 25. For example, the host computer 10 shows an access monitor 19.

Figure 20:
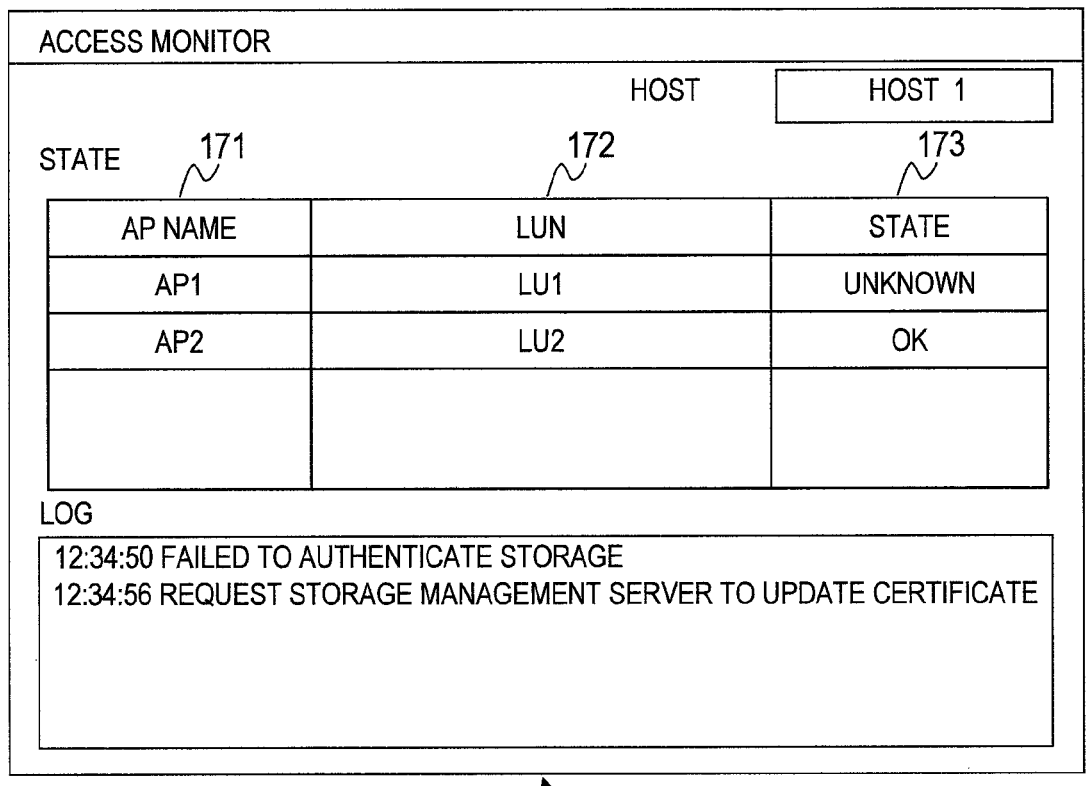
FIG. 20 is an access monitor shown on the host computer according to the embodiment of this invention.

FIG. 20 is the access monitor 19 shown on a host computer 10 according to the embodiment of this invention.

The access monitor 19 is shown if the host computer 10 transmits a request for updating a host certificate. Thus, the access monitor 19 shows that an access from an application program 121 to an LU 25 is in an unknown state.

Moreover, the access monitor 19 includes an access state management table. The access state management table is the same as that included in the access monitor 17 described with reference to FIG. 18, and a detailed description thereof, therefore, is omitted.

FIG. 17 will now be referred again.

The storage area access control unit 124 included in the host computer 10, upon transmitting the request for updating the host certificate, determines whether a new certificate has been received from the storage management server 30 (S1119). In a case where a new certificate is not received, the storage area access control unit 124 included in the host computer 10 waits until a new certificate is received.

On the other hand, upon receiving a new certificate, the storage area access control unit 124 included in the host computer 10 returns to the step S1112. Then, the storage area access control unit 124 included in the host computer 10 repeats the access execution process.

Figure 21:
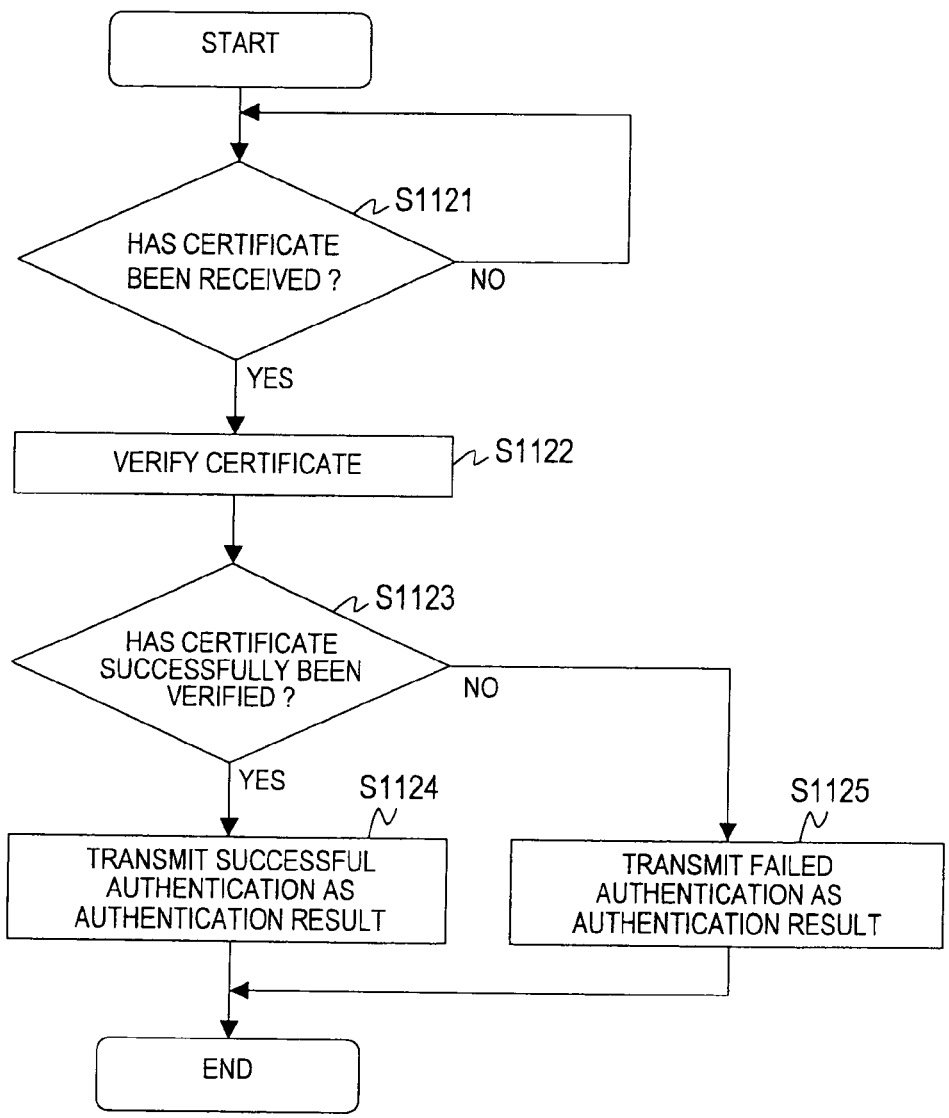
FIG. 21 is a flowchart of an authentication process by the storage system according to the embodiment of this invention.

FIG. 21 is a flowchart of the authentication process by a storage system 20 according to the embodiment of this invention.

The storage system 20 determines whether a certificate has been received from a host computer 10 (S1121). If a certificate has not been received, the storage system 20 waits until a certificate is received. On the other hand, if a certificate has been received, the storage system 20 uses a certificate owned by the storage system 20 to verify the received certificate (S1122).

Then, the storage system 20 determines whether the received certificate has been successfully verified (S1123). Upon successfully verifying the certificate, the storage system 20 transmits an authentication result indicating the successful authentication to the host computer 10 (S1124). Then, the storage system 20 finishes the authentication process.

On the other hand, upon failing in verifying the certificate, the storage system 20 transmits an authentication result indicating the failed authentication to the host computer 10 (S1125). Then, the storage system 20 finishes the authentication process.

As described above, upon access from an application program 121 included in a host computer 10 to an LU 25 provided by a storage system 20, the host computer 10 transmits a certificate corresponding to the access to the storage system 20. It should be noted that the certificate to be transmitted guarantees the application program 121 as an access source, and guarantees the LU 25 as an access destination. The storage system 20 receives the certificate from the host computer 10. Then, the storage system 20 carries out the authentication by verifying the received certificate. Then, if the authentication by the storage system 20 has been successful, the host computer 10 executes an access from the application program 121 to the LU 25.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
at least one host computer including a processor, a memory, and an interface;
at least one storage system coupled to the host computer; and
a storage management server coupled to the host computer and the storage system,
wherein the storage management server creates a storage certificate and transmits the storage certificate to the storage system,
wherein the storage system comprises:
a physical disk that stores data requested to be written by the host computer;
a disk controller that controls input and output of data to and from the physical disk, and provides the host computer with a storage area of the physical disk, wherein the storage area is presented to the host as at least one logical unit; and
an authentication unit,
wherein the storage system integrates the storage certificate received from the storage management server into the authentication unit and notifies the storage management server that the storage certificate has been received, and
wherein when the storage management server receives notification from the storage system that the storage certificate has been received, the storage management server creates a host certificate and transmits the host certificate to the host computer,
wherein the host computer comprises:
at least one application program that accesses the at least one logical unit; and
a storage area access control unit,
wherein the host certificate corresponds to both the application program and the at least one logical unit of the storage system,
wherein the application program is a source of access to the storage system,
wherein before the application program accesses the at least one logical unit, the storage area access control unit transmits authentication information including the host certificate to the storage system, that is used to verify that the application program is the source of the access to the storage system, wherein the storage system verifies the received host certificate, and upon succeeding in verifying the received host certificate, transmits a notice of the successful authentication to the storage area access control unit, wherein the storage area access control unit, upon receiving the notice of the successful authentication, permits the application program to access the logical unit, and wherein each of the storage certificate and the host certificate are digital certificates.

2. The computer system according to claim 1, wherein the authentication information further guarantees the logical unit to be accessed by an application program as a destination of the access.

3. The computer system according to claim 1, wherein the storage area access control unit:

manages at least one piece of the authentication information;

identifies, before an application program make access to the logical unit, authentication information from the managed authentication information, the identified authentication information guaranteeing the application program as a source of the access and the logical unit to be accessed by the application program as a destination of the access; and transmits the identified authentication information to the storage system.

4. The computer system according to claim 3, wherein the storage area access control unit:

measures the number of accesses from the application program to the logical unit; and updates, upon the measured number of accesses exceeding a predetermined value, at least one piece of the managed authentication information.

5. The computer system according to claim 3, wherein the storage system verifies the received authentication information, and upon failing in verifying the received authentication information, transmits a notice of the failed authentication to the storage area access control unit, and wherein the storage area access control unit, upon receiving the notice of the failed authentication, updates at least one piece of the managed authentication information.

6. The computer system according to claim 1, wherein the host computer accesses the logical unit by using one of multiple access paths, wherein the storage system verifies the received authentication information, upon succeeding in verifying the received authentication information, transmits a notice of the successful authentication to the storage area access control unit, and upon failing in verifying the received authentication information, transmits a notice of the failed authentication to the storage area access control units, and wherein when one of the notice of the successful authentication and the notice of the failed authentication is not received within a predetermined period after the transmission of the authentication information, the storage area access control unit uses a different access path to re-transmit the authentication information to the storage system.

7. The computer system according to claim 1, wherein upon receiving a path setting request from a user to set an access path from the host computer to the at least one logical unit, the storage management server instructs the storage system to set the access path, and the storage system sets the access path accordingly, and wherein the storage system transmits a path setting result including information regarding the configuration of the access path set to the storage management server.

8. An access control method for a computer system, the computer system comprising: at least one host computer including a processor, a memory, and an interface; at least one storage system coupled to the host computer, the storage system including a physical disk, a disk controller, and an authentication unit; and a storage management server coupled to the host computer and the storage system, the access control method comprising:

creating, by the storage management server, a storage certificate and transmitting the storage certificate to the storage system, integrating, by the storage system, the storage certificate received from the storage management server into the authentication unit and notifying the storage management server that the storage certificate has been received;

when the storage management server receives notification from the storage system that the storage certificate has been received, creating, by the storage management server, a host certificate, and transmitting the host certificate to the host computer, wherein the host certificate corresponds to both the application program and the at least one logical unit of the storage system, wherein the application program is a source of access to the storage system;

storing, by the storage system, data requested to be written by the host computer;

controlling, by the disk controller, input and output of data to and from the physical disk;

providing, by the storage system, the host computer with a storage area of the physical disk, wherein the storage area is presented to the host as at least one logical unit;

executing, by the host computer, at least one application program that accesses the logical unit; and transmitting, by the host computer, before the application program makes accesses the logical unit, authentication information including a host certificate to the storage system, that is used to verify that the application program is the source of the access to the storage system;

verifying, by the storage system, the received host certificate;

transmitting, by the storage system, upon succeeding in verifying the received host certificate, a notice of a successful authentication to the host computer; and permitting, by the host computer, upon receiving the notice of the successful authentication, the application program to access the logical unit, wherein each of the storage certificate and the host certificate are digital certificates.

9. The access control method according to claim 8, wherein the authentication information further guarantees the logical unit to be accessed by the application program as a destination of the access.

10. The access control method according to claim 8, further comprising:

storing, by the host computer, at least one piece of the authentication information;

identifying, before the application program makes access to the logical unit, authentication information from the stored authentication information, the identified authentication information guaranteeing the application program as a source of the access and the logical unit to be accessed by the application program as a destination of the access; and transmitting, by the host computer, the identified authentication information to the storage system.

11. The access control method according to claim 10, further comprising:

measuring, by the host computer, the number of accesses from the application program to the logical unit; and updating, by the host computer, upon the measured number of accesses exceeding a predetermined value, at least one piece of the stored authentication information.

12. The access control method according to claim 10, further comprising:

verifying, by the storage system, the received authentication information;

transmitting, by the storage system, upon failing in verifying the received authentication information, a notice of a failed authentication to the host computer; and updating, by the host computer, upon receiving the notice of the failed authentication, at least one piece of the stored authentication information.

13. The access control method according to claim 8, further comprising:

allowing the host computer to access the logical unit by using one of multiple access paths;

verifying, by the storage system, the received authentication information;

transmitting, by the storage system, upon succeeding in verifying the received authentication information, a notice of a successful authentication to the host computer;

transmitting, by the storage system, upon failing in verifying the received authentication information, a notice of the failed authentication to the host computer; and using, by the host computer, a different access path to re-transmit the authentication information to the storage system when one of the notice of the successful authentication and the notice of the failed authentication is not received within a predetermined period after the transmission of the authentication information.

14. A host computer, which is coupled to at least one storage system and a storage management server coupled to the host computer and the storage system, the host computer comprising:

a processor;
a memory;
an interface, wherein the storage management server creates a storage certificate and transmits the storage certificate to the storage system, wherein the storage system provides the host computer with a physical disk for storing data requested to be written by the host computer, wherein the physical disk is presented to the host as at least one logical unit, wherein the storage system integrates the storage certificate received from the storage management server into an authentication unit of the storage system and notifies the storage management server that the storage certificate has been received, and wherein when the storage management server receives notification from the storage system that the storage certificate has been received, the storage management server creates a host certificate and transmits the host certificate to the host computer;

at least one application program making access to the logical unit; and a storage area access control unit, wherein the host certificate corresponds to both the application program and the logical unit of the storage system, wherein the application program is a source of access to the storage system, wherein before the application program accesses the logical unit, the storage area access control unit transmits authentication information including a host certificate to the storage system, that is used to verify that the application program is the source of the access to the storage system, wherein the storage system verifies the received authentication information, and, upon succeeding in verifying the received authentication information, transmits a notice of the successful authentication to the storage area access control unit, wherein the storage area access control unit, upon receiving the notice of the successful authentication, permits the application program to make access to the logical unit, and wherein each of the storage certificate and the host certificate are digital certificates.

* * * * *